US012672756B2

(12) United States Patent
Lee et al.

(10) Patent No.: US 12,672,756 B2
(45) Date of Patent: Jul. 7, 2026

(54) DISHWASHER

(71) Applicant: LG Electronics Inc., Seoul (KR)

(72) Inventors: Sunghun Lee, Seoul (KR); Beomchul Park, Seoul (KR); Youngsoo Son, Seoul (KR); Daegyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/713,350

(22) PCT Filed: Nov. 2, 2022

(86) PCT No.: PCT/KR2022/017016
§ 371 (c)(1),
(2) Date: May 24, 2024

(87) PCT Pub. No.: WO2023/096202
PCT Pub. Date: Jun. 1, 2023

(65) Prior Publication Data
US 2025/0009201 A1　　Jan. 9, 2025

(30) Foreign Application Priority Data
Nov. 25, 2021　(KR) ........................ 10-2021-0164507

(51) Int. Cl.
*A47L 15/44* (2006.01)
*A47L 15/42* (2006.01)
*F16K 27/02* (2006.01)

(52) U.S. Cl.
CPC ....... *A47L 15/4436* (2013.01); *A47L 15/4257* (2013.01); *F16K 27/02* (2013.01)

(58) Field of Classification Search
CPC ............. A47L 15/4415; A47L 15/4445; A47L 15/4463; A47L 15/449
See application file for complete search history.

(56) References Cited

U.S. PATENT DOCUMENTS

| | | | |
|---|---|---|---|
| 5,176,297 A | 1/1993 | Mooney et al. | |
| 6,453,917 B1 | 9/2002 | Biechele | |

(Continued)

FOREIGN PATENT DOCUMENTS

| | | |
|---|---|---|
| CN | 108076622 | 9/2020 |
| DE | 102010003774 A1 | 10/2011 |

(Continued)

OTHER PUBLICATIONS

DE102010003774 A1—Machine translation (Year: 2010).*
Extended European Search Report in European Appln. No. 22898884. 6, mailed on Feb. 21, 2025, 11 pages.

*Primary Examiner* — Daphne M Barry
(74) *Attorney, Agent, or Firm* — Fish & Richardson P.C.

(57) ABSTRACT

A dishwasher includes a detergent supply device, in which the detergent supply device includes: a case mounted to one side of the door; a cartridge disposed in the case and storing a detergent solution; a connector body disposed in the case, connected to the cartridge, and having a discharge chamber temporarily storing the detergent solution discharged from the cartridge or discharging the detergent solution to an outside; a valve movably mounted in the connector, and allowing the discharge chamber to communicate with the cartridge or allowing the discharge chamber to communicate with an outside, depending on arrangement; and a solenoid which is disposed at one side of the case, and when a current is applied, is configured to generate a magnetic field to move the valve in a first direction.

19 Claims, 27 Drawing Sheets

(56)                    References Cited

U.S. PATENT DOCUMENTS

| | | | |
|---|---|---|---|
| 2002/0153029 | A1 | 10/2002 | Cerruti et al. |
| 2011/0139816 | A1 | 6/2011 | Kessler et al. |
| 2014/0167579 | A1 | 6/2014 | Classen et al. |
| 2017/0055803 | A1 | 3/2017 | Ayvazoglu et al. |

FOREIGN PATENT DOCUMENTS

| | | | |
|---|---|---|---|
| EP | 3391800 | A1 | 10/2018 |
| KR | 10-1616144 | | 4/2016 |
| KR | 10-2124363 | | 6/2020 |
| KR | 10-2143470 | | 8/2020 |

\* cited by examiner

DISHWASHER

CROSS-REFERENCE TO RELATED APPLICATIONS

This application is a National Stage application under 35 U.S.C. § 371 of International Application No. PCT/KR2022/017016, filed on Nov. 2, 2022, which claims the benefit of Korean Patent Application No. 10-2021-0164507, filed on Nov. 25, 2021. The disclosures of the prior applications are incorporated by reference in their entirety.

TECHNICAL FIELD

The present disclosure relates to a dishwasher, and more particularly, to a dishwasher including a detergent supply device.

BACKGROUND ART

Dishwashers are devices for removing dirt from dishes by washing, rinsing, and drying the dishes. For cleaning the dishes, a liquid or powder detergent is put into a dispenser located in the dishwasher.

However, it is inconvenient to directly add a detergent and the like every time the dishwasher is used. In addition, the input amount of detergent may vary as a user manually adds the detergent and the like.

U.S. Pat. No. 9,345,381 B2 discloses a detergent supply device inserted into a door. However, it is inconvenient to insert a cartridge into the door. Further, a method of discharging a liquid detergent from the cartridge is not specifically disclosed, such that it is difficult to solve the problem with adding a constant amount of detergent, Korean Laid-Open Patent Publication No. KR10-2011-0089733 discloses a dishwasher using a dehumidifying material in the form of a cartridge.

However, the dishwasher has a structure in which the dehumidifying material is placed on an air flow path, causing a problem in that it is difficult to directly put the dehumidifying material into a washing space of a cabinet, and to put a fixed amount of dehumidifying material.

DISCLOSURE OF INVENTION

Technical Problem

It is an objective of the present disclosure to provide a dishwasher capable of eliminating a user's inconvenience of putting detergent into the dishwasher every time the user uses the dishwasher.

It is another objective of the present disclosure to provide a dishwasher capable of putting a fixed amount of detergent or an amount of detergent suitable for a washing method every time the dishwasher is used.

It is yet another objective of the present disclosure to provide a dishwasher capable of maintaining cleanliness of a detergent supply device using a cartridge.

It is further another objective of the present disclosure to provide a dishwasher including a detergent supply device in which a cartridge to be replaced or separated and components connected thereto may be simply assembled or separated.

The objectives of the present disclosure are not limited to the aforementioned objectives and other objectives not described herein will be clearly understood by those skilled in the art from the following description.

Solution to Problem

A dishwasher of the present disclosure includes: a cabinet defining a washing space therein and having one open side; a door covering the one open side of the cabinet; and a detergent supply device mounted to the door and configured to supply a detergent to the washing space.

In order to achieve the above objectives, the detergent supply device may include: a case mounted to one side of the door; a connector having one side removably mounted to the case and another side to which a cartridge for storing a detergent solution is mounted, the connector having a discharge chamber discharging the detergent solution stored in the cartridge to an outside: a valve movably mounted in the connector, and allowing the discharge chamber to communicate with the cartridge or allowing the discharge chamber to communicate with an outside of the connector, depending on arrangement; and a valve moving device disposed at one side of the case and configured to move the valve in a first direction, in which by moving the valve using a solenoid, the detergent solution in the cartridge may be discharged to the outside. In addition, the detergent solution discharged from the cartridge is discharged through the discharge chamber, such that a constant amount of detergent solution may be discharged.

The connector may include a first discharge hole through which the detergent solution, discharged from the cartridge, is discharged to the discharge chamber, and a second discharge hole through which the detergent solution, stored in the discharge chamber, is discharged to the outside of the connector, wherein depending on arrangement, the valve may open and close the first discharge hole or the second discharge hole.

Depending on whether the valve moving device operates, the valve may move in a first direction in which the valve moving device is disposed or in a second direction opposite to the first direction, wherein when moving in the first direction, the valve may close the second discharge hole, and when moving in the second direction, the valve may close the first discharge hole, thereby selectively opening and closing the first discharge hole and the second discharge hole.

The valve moving device may use a solenoid which, when a current is a applied, generates a magnetic field to move the valve in the first direction.

The connector may further include: a connector body connected to the cartridge, and having a first discharge hole through which the detergent solution discharged from the discharge chamber and the cartridge is discharged to the discharge chamber, and a second discharge hole through which the detergent solution stored in the discharge chamber is discharged to the outside of the connector; and a connector cover connected to the connector body and forming a space in which the valve moves into the valve moving device, thereby separating a space in which the valve moves from a space in which the solenoid is disposed. That is, the connector body, the valve, and the connector cover may be easily removed from the case.

The valve may include: a valve body disposed inside the discharge chamber, and opening and closing the first discharge hole or the second discharge hole; and a valve mover connected to the valve body and moving the valve body by the valve moving device, wherein the valve mover may be disposed in a space formed by the connector cover, such that the valve opening and closing the discharge chamber is disposed in the connector cover which is disposed separately from the case.

The connector cover may include a cover plate connected to the connector body, and a valve housing inserted into the valve moving device and defining a space in which the valve mover is disposed, wherein the valve housing may separate a space in which the valve moving device is disposed from a space in which the valve is disposed, thereby preventing the detergent solution, discharged through the discharge chamber, from flowing into the valve moving device or the case.

The detergent supply device may include an elastic member having a first side that contacts the cover plate, and a second side that contacts the valve, wherein the elastic member may apply force to the valve in the second direction, such that when the valve moving device is not in operation, a position of the valve may be determined by the elastic member.

The valve body may include an elastic member cover having a surface that contacts the second side of the elastic member, and defining a space in which the elastic member is disposed.

The valve mover may include: an inner rod connected to the valve body; and a flinger made of a steel material steel responsive to the valve moving device, and disposed in the valve housing, such that the flinger may be moved by operation of the valve moving device, and the inner rod may move the valve body.

The valve body may include: an outer rod formed in a front-rear direction in which the discharge chamber extends; a first cap disposed at an end of the outer rod, and opening and closing the first discharge hole; and a second cap extending in a circumferential direction of the outer rod, and opening and closing the second discharge hole, such that the first discharge hole and the second discharged hole may be opened and closed by the first cap and the second cap.

The connector may include a discharge connector disposed between the connector body and the connector cover, and discharging the detergent solution, flowing from the discharge chamber, to the washing space of the cabinet, such that the detergent solution flowing from the discharge chamber may be discharged through the discharge connector.

The discharge connector may have a cylindrical shape with a hollow inner portion and have a plurality of third discharge holes formed in a circumferential surface thereof, the plurality of third discharge holes being spaced apart from each other in a circumferential direction.

The discharge connector may be disposed at a discharge end of the discharge chamber, wherein an inner diameter of the discharge connector may be smaller than an inner diameter of the discharge chamber, such that when the valve is moved by the valve moving device in a first direction, the valve may come into contact with the discharge connector to close the second discharge hole of the discharge chamber, in which the discharge connector may contact the valve to close the second discharge hole.

The case may define a cartridge space therein in which the cartridge is disposed, the case including a connector mounting part which is disposed under the cartridge space and to which the connector is connected, wherein the valve moving device may be disposed at a rear of the case in which the connector mounting part is disposed, such that the valve is disposed inside the case, and the valve moving device may be disposed outside of the case.

The connector mounting part may include a first wall in which at least one valve hole is formed, and a pair of second walls on which a fixing protrusion for fixing the connector is disposed, the pair of second walls extending forward from both ends of the first wall, wherein the first wall may include a cover housing extending to a rear side where the valve hole is formed, and defining a space in which the valve is disposed, such that an area in which the valve moving device is disposed may be separated from an area in which the valve is disposed.

The connector may include a holder which is disposed on both sides thereof facing the second wall, and is fixed to the fixing protrusion, wherein the holder may surround the fixing protrusion, except a side in a direction in which the connector is inserted, such that the connector may be fixed to the case.

The case may include: a rear wall disposed to face the door; an upper wall covering a top of the cartridge space; both sidewalls extending forward from both ends of the rear wall; and a lower wall covering a bottom of the cartridge space or the connector mounting part, wherein the lower wall may have an inclined structure that extends downward toward a front, such that the detergent solution discharged from the connector may flow along the lower wall.

The dishwasher may further include a case door disposed on one side of the case and covering the cartridge space, wherein a separation space, through which the detergent solution discharged from the cartridge is discharged into the washing space, may be formed between a lower end of the case door and a lower end of the case, such that the detergent solution flowing along the lower wall may flow into the washing space through the separation space.

Other detailed matters of the exemplary embodiments are included in the detailed description and the drawings.

Advantageous Effects of Disclosure

A dishwasher according to the present disclosure has one or more of the following effects.

First, by providing a structure in which a detergent solution stored in a cartridge may be discharged in a constant amount, thereby eliminating a user's inconvenience of putting detergent into the dishwasher every time the user uses a the dishwasher.

Second, the dishwasher includes a cartridge for storing a detergent solution, a connector for discharging a constant amount of the detergent solution, stored in the cartridge, to the outside, and a valve. In addition, the connector may include a discharge chamber to temporarily store the detergent solution or to discharge the detergent solution, and may move the valve using a solenoid. Accordingly, by adjusting the amount of detergent solution, the detergent may be added in an amount suitable for a washing method, thereby achieving the effect of improving cleaning performance of the dishwasher.

Third, an area in which a detergent solution is discharged, an area in which a solenoid is disposed, and an area in which a case is disposed are separated from each other, such that no contamination occurs in areas other than the connector. Accordingly, by removing and cleaning only the connector, the detergent supply device may remain clean.

Fourth, by providing a structure in which a connector includes a connector body, a valve, and a connector cover, only the connector may be removed from or mounted to the case, thereby allowing a user to easily install or remove the connector.

The effects of the present disclosure are not limited to the aforesaid, and other effects not described herein will be clearly understood by those skilled in the art from the following description of the appended claims.

BRIEF DESCRIPTION OF DRAWINGS

FIG. 16 is an exploded perspective view of a cartridge according to an embodiment of the present disclosure.

FIGS. 21A and 21B are diagrams explaining deformation of a cartridge depending on material, in which FIG. 21A illustrates a state in which a detergent solution is filled in the cartridge, and FIG. 21B illustrates a state in which the detergent solution is partially discharged from the cartridge.

FIGS. 23 to 25 are diagrams explaining a position of a valve depending on operation of a valve moving device, and a flow of a detergent solution, in which FIG. 23 illustrates an initial state, FIG. 24 illustrates a state in which the valve is moved in a first direction by operation of the valve moving device, and FIG. 25 illustrates a state in which the valve is moved in a second direction as the valve moving device stops operating.

MODE FOR THE INVENTION

Figure 1:
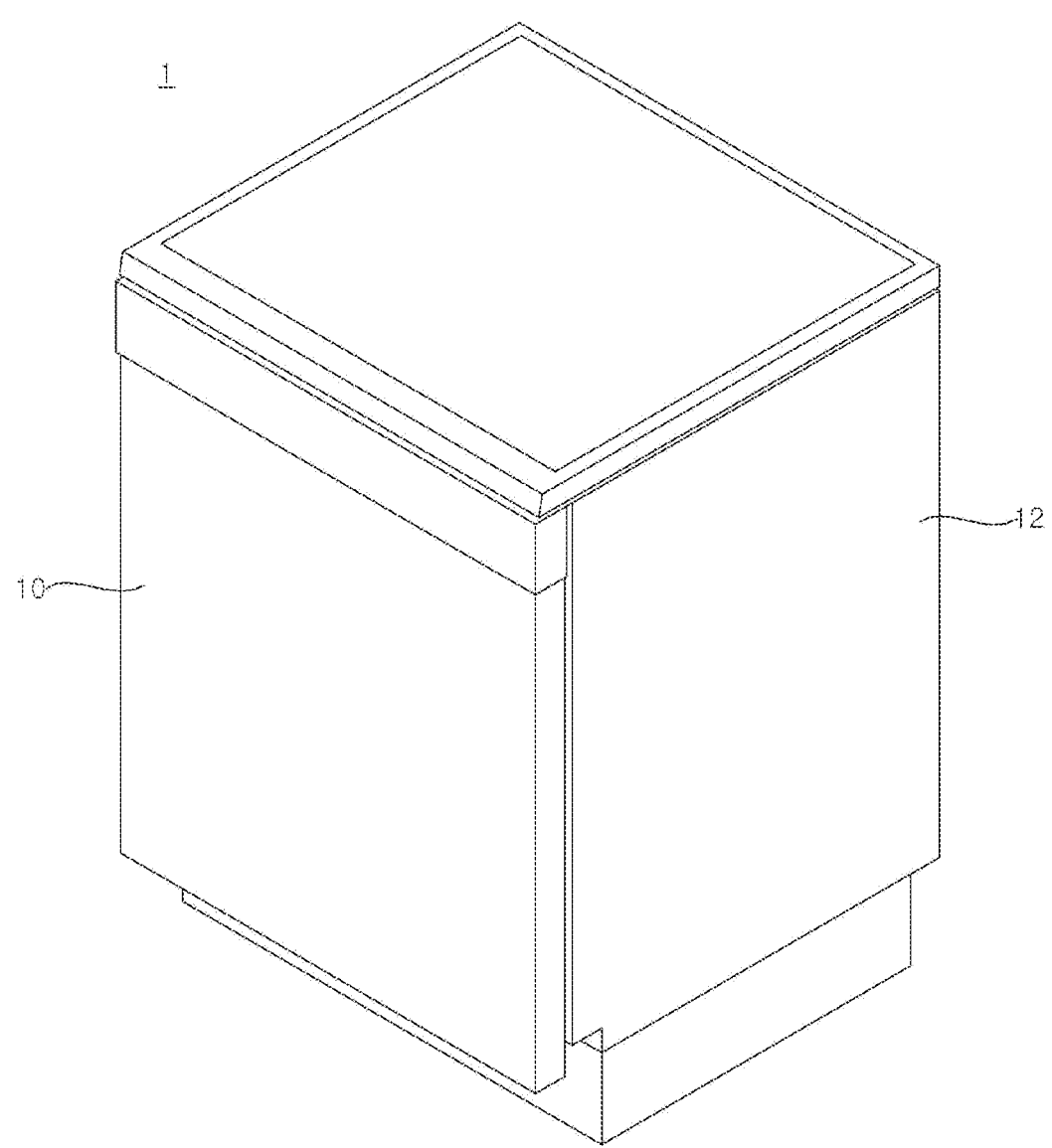
FIG. 1 is a perspective view of a dishwasher according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein, Rather, these exemplary embodiments are provided so that this disclosure will be thorough and complete and will fully convey the concept of the invention to those skilled in the art, and the present disclosure will only be defined by the appended claims. Like reference numerals refer to like elements throughout the specification.

Hereinafter, a dishwasher according to an embodiment of the present disclosure will be described with reference to embodiments of the present disclosure and the drawings illustrating the embodiments.

Figure 2:
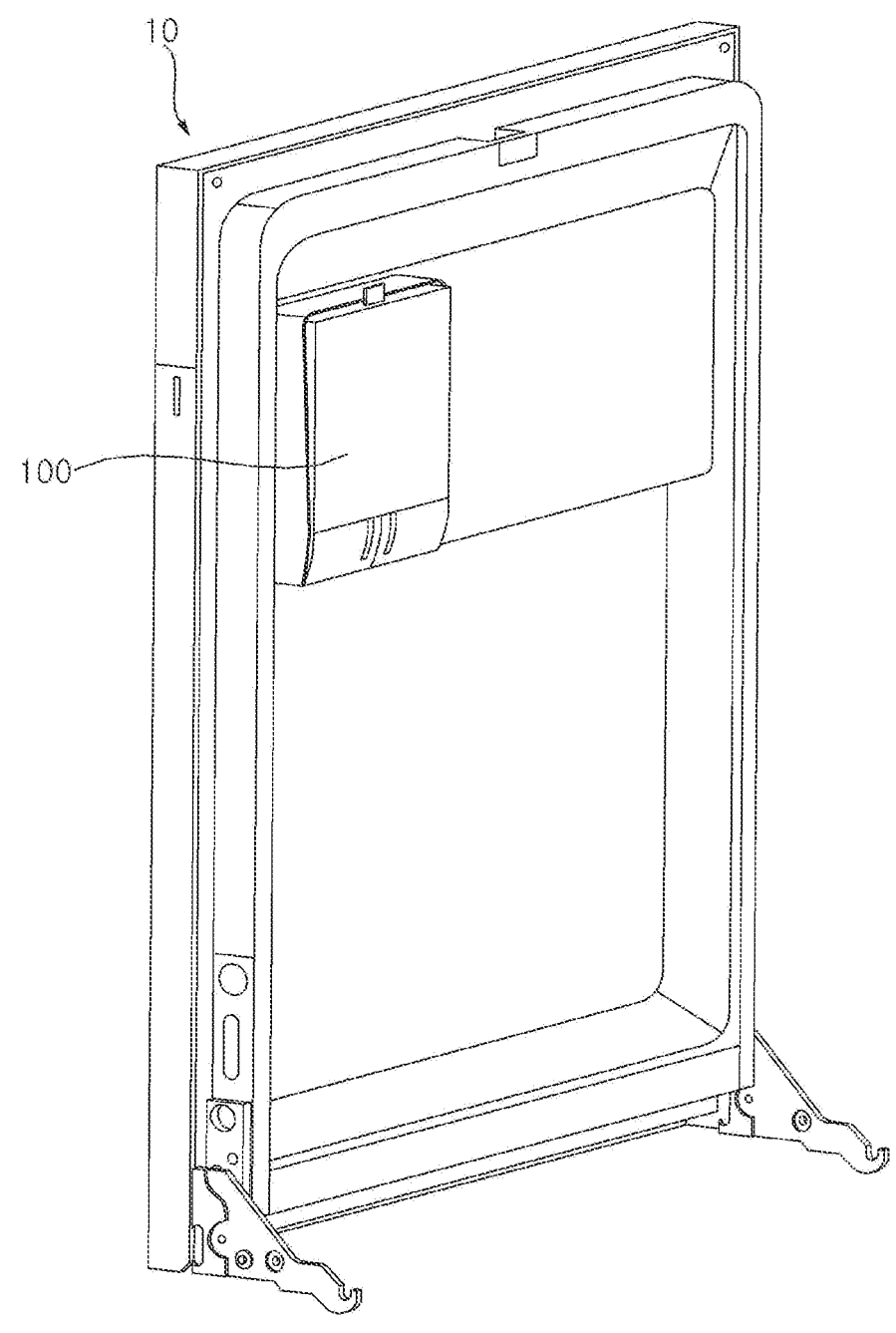
FIG. 2 is a perspective view of one side of a door of a dishwasher according to an embodiment of the present disclosure.

Referring to FIGS. 1 and 2, a dishwasher includes a cabinet 12 forming an exterior thereof and defining a washing space, a door 10 opening and closing a one open side of the cabinet 12, and a detergent supply device 100 configured to supply a detergent to the washing space.

Referring to FIG. 2, the detergent supply device 100 is mounted on the inside the door 10. Accordingly, the detergent and the like discharged from the detergent supply device 100 may be put into the washing space formed inside the cabinet 12.

Figure 3:
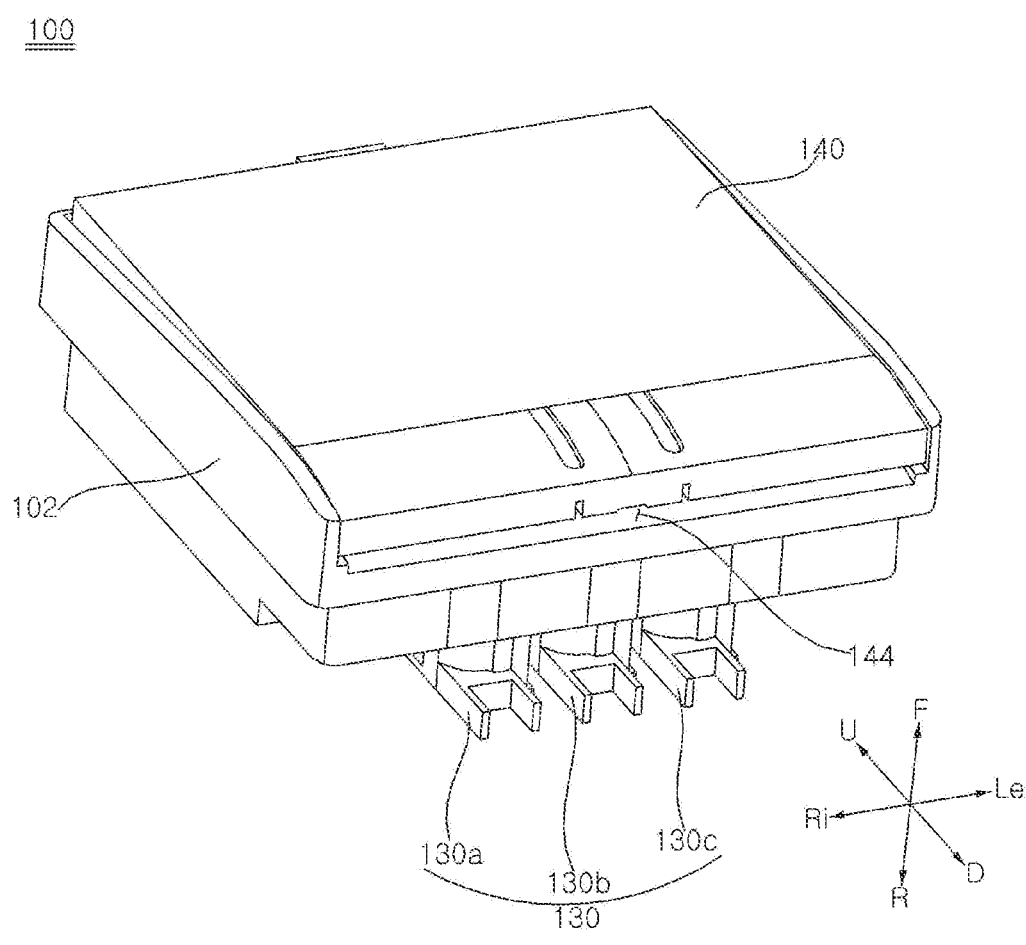
FIG. 3 is a perspective view of a detergent supply device according to an embodiment of the present disclosure.
Figure 5:
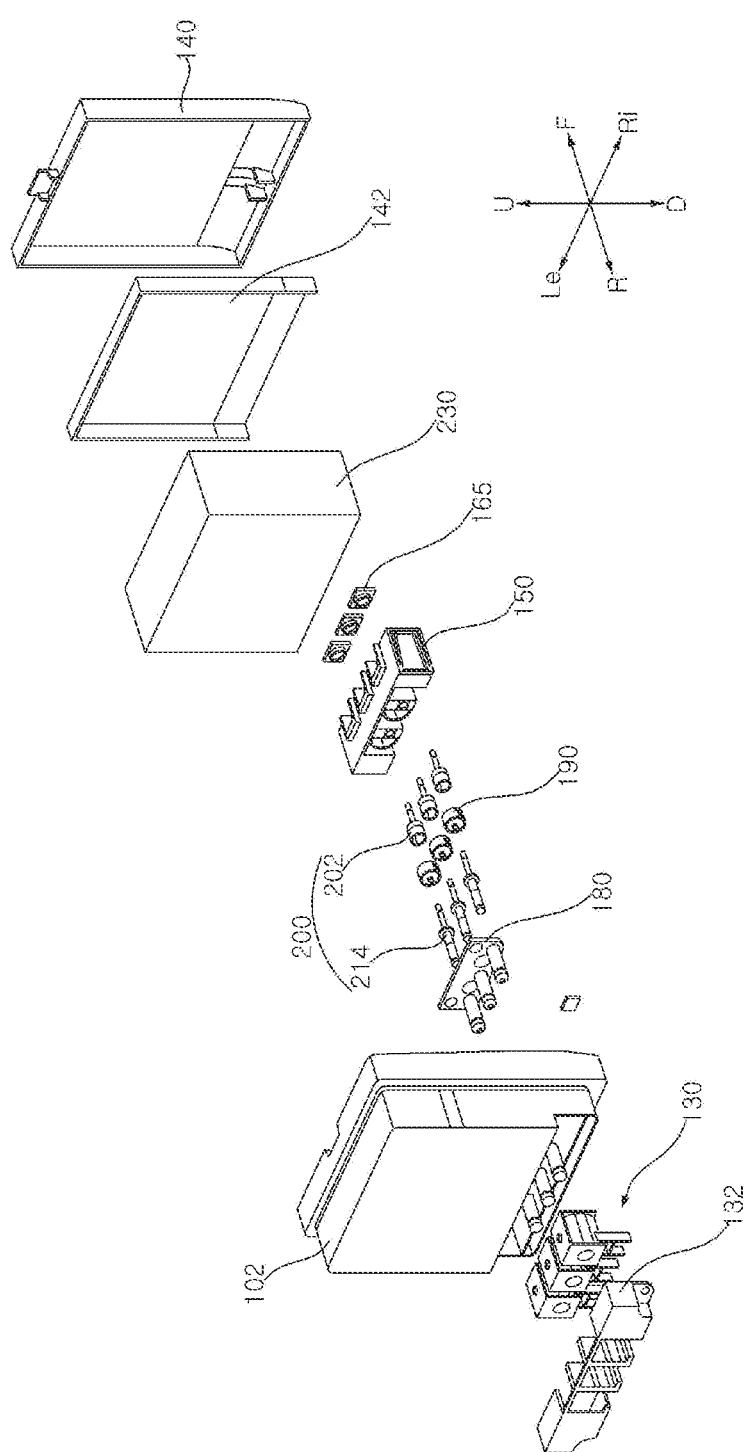
FIG. 5 is an exploded perspective view of a detergent supply device according to an embodiment of the present disclosure.

Referring to FIGS. 3 and 5, the detergent supply device 100 includes a case 102 mounted to the door 10 and defining a cartridge space 104 in which a cartridge 230 for storing a detergent is disposed, a case door 140 covering one open side of the case, a connector 150 having a discharge chamber 158 formed therein which temporarily stores a detergent solution, discharged from the cartridge 230 for storing the detergent solution, or which discharges the detergent solution to the outside, a valve 200 which is movably mounted in the discharge chamber 158 of the connector 150 and, depending on arrangement, allows the discharge chamber 158 and the cartridge 230 to communicate with each other or the discharge chamber 158 to communicate with the outside, and a valve moving device 130 fixedly disposed at one side of the case 102 and configured to allow the discharge chamber 158 to communicate with the outside or block the discharge chamber 158 from the outside.

The connector 150 may include a connector body 151 (see FIG. 11A) having the discharge chamber 158, a connector cover 180 (see FIG. 11A) connected to the connector 150 and defining a space in which some components of the valve 200 are disposed, and a discharge connector 190 (see FIG. 11A) disposed between the connector 150 and the connector cover 180 and discharging a detergent solution, flowing from the discharge chamber 158, into a the washing space of the cabinet 12.

The detergent solution stored in the cartridge 230 may be a concept including detergents, conditioners, deodorants, desiccants, and the like. The detergent solution stored in the cartridge 230 is a liquid-type detergent, and may flow downward by gravity when discharged from the cartridge 230.

Figure 4:
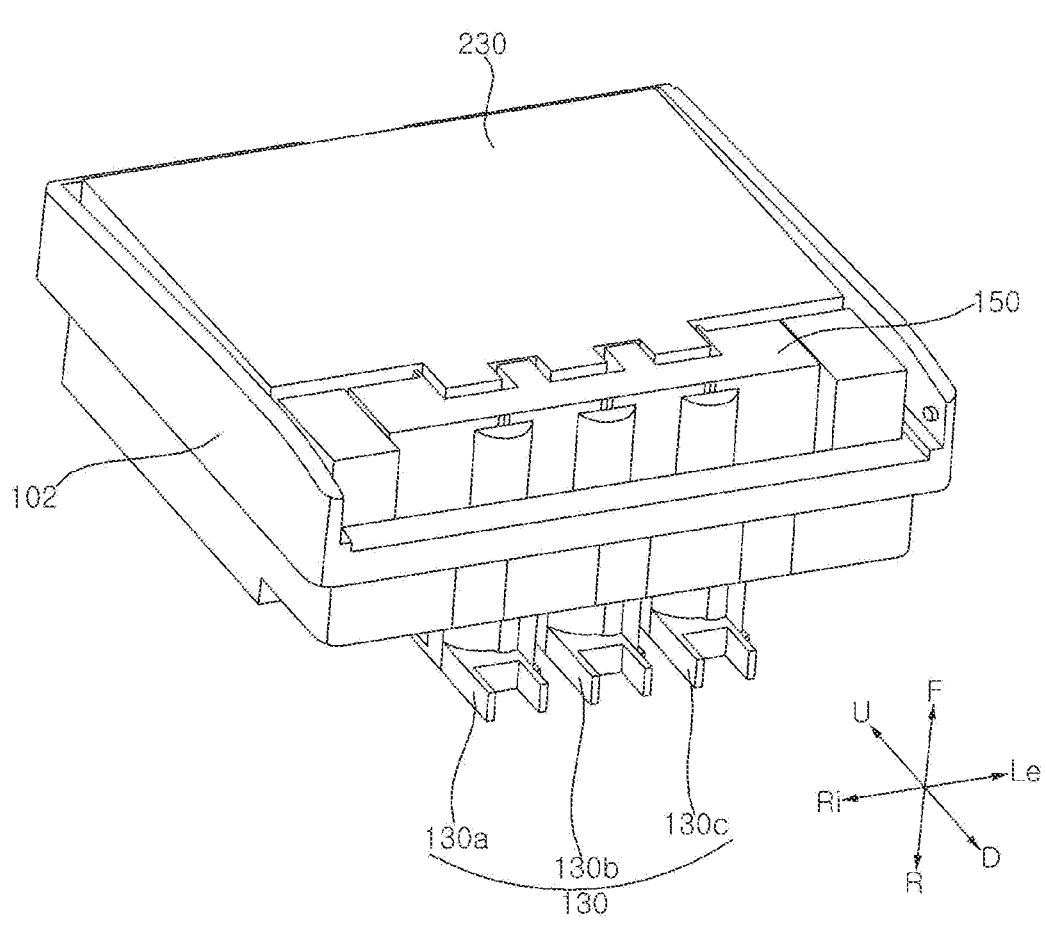
FIG. 4 is perspective view of the detergent supply device of FIG. 3, from which a case door is removed.

The case 102 defines a space in which the cartridge 230 and the connector 150 are disposed, and has one open side. Accordingly, referring to FIG. 4, the cartridge 230 and the connector 150 may be disposed in the case 102 while the case door 140 is removed.

The case door 140 may open and close the one open side of the case 102. That is, as illustrated in FIG. 3, the case door 140 may close the one side of the case 102. The case door 140 is removably mounted to the case 102 to open the one open side of the case 102. When the case 102 is closed by the case door 140, a separation space 144 is formed between a lower portion of the case 102 and a lower portion of the case door 140. The detergent solution, discharged from the cartridge 230 and the connector 150, may be discharged through the separation space 144 into the washing space of the cabinet 12.

The detergent supply device 100 includes a door louver 142 installed on the case door 140 and pressing the cartridge 230, disposed inside the case 102, toward the case 102. The door louver 142 is disposed on one side of the case door 140 to seal a space between the case door 140 and the case 102.

Figure 6:
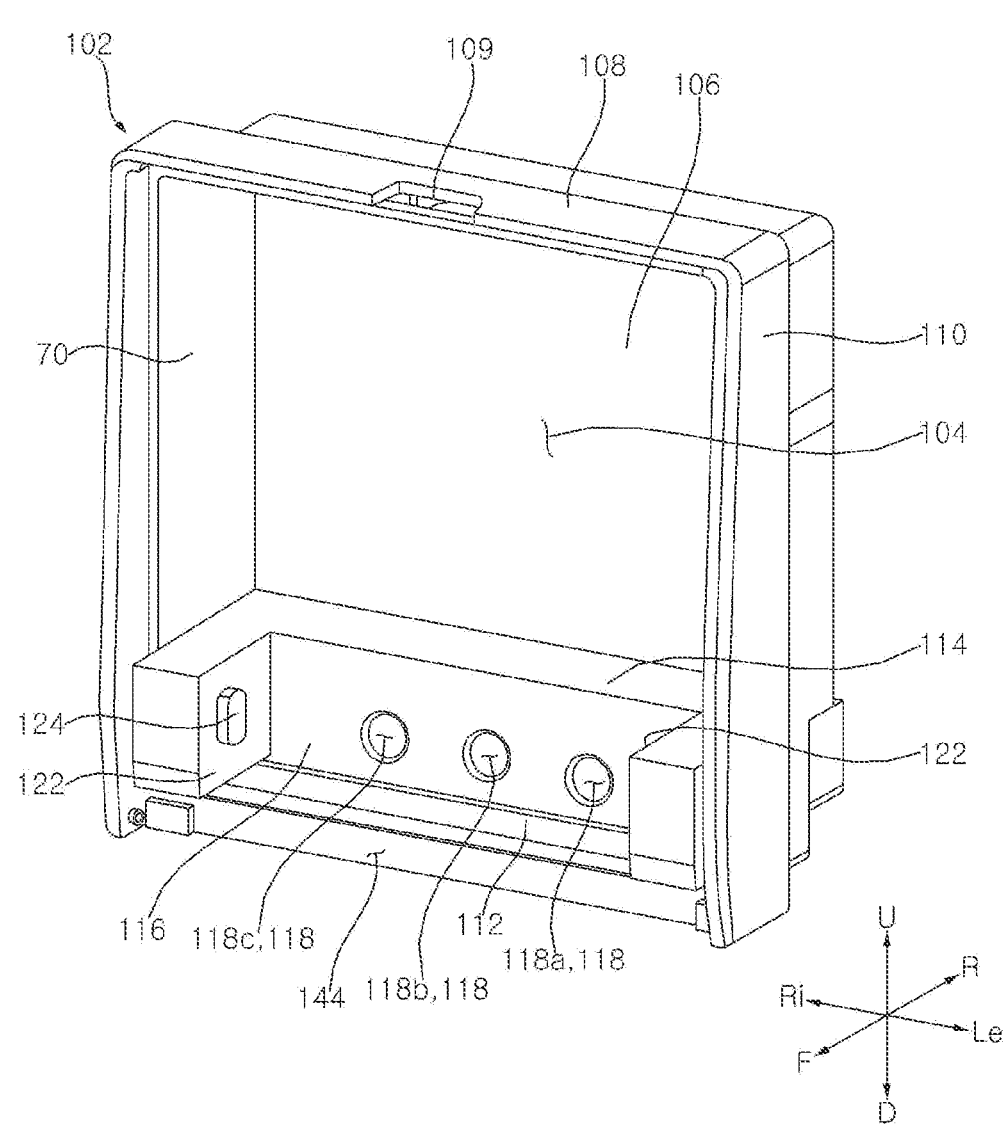
FIG. 6 is an exploded perspective view of a case according to an embodiment of the present disclosure.
Figure 7:
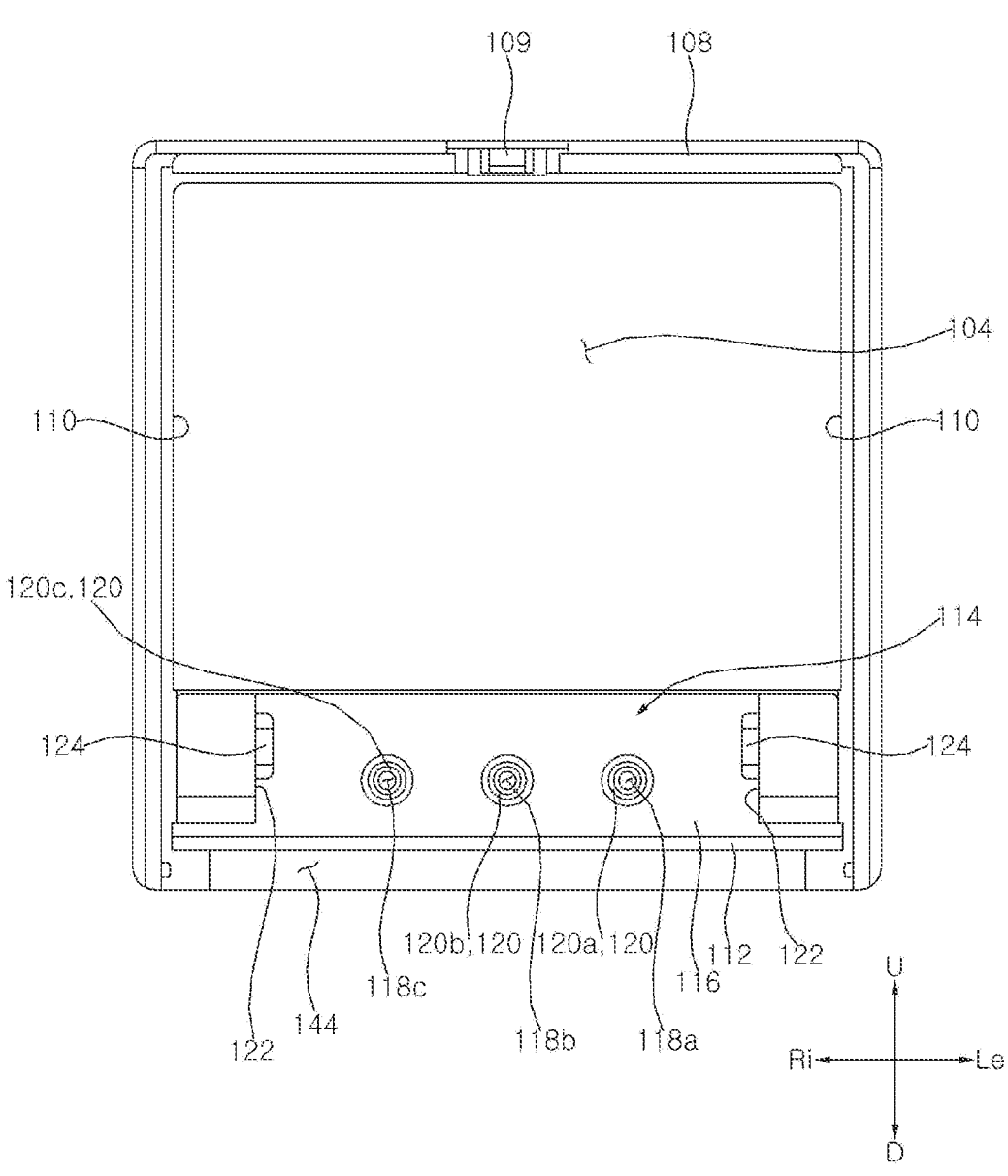
FIG. 7 is a front view of a case according to an embodiment of the present disclosure.
Figure 8:
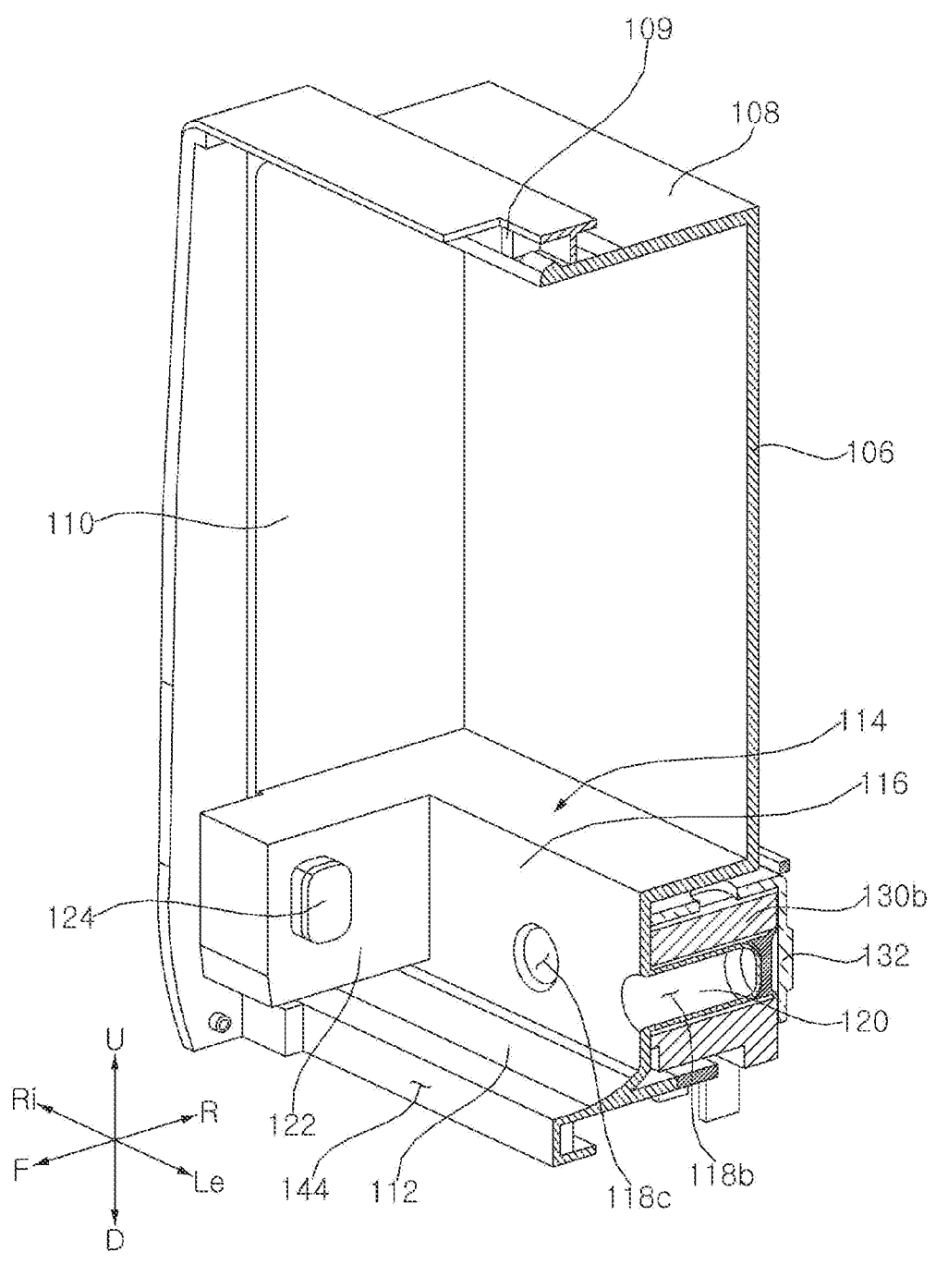
FIG. 8 is a perspective view of a case which is vertically taken, according to an embodiment of the present disclosure.
Figure 9:
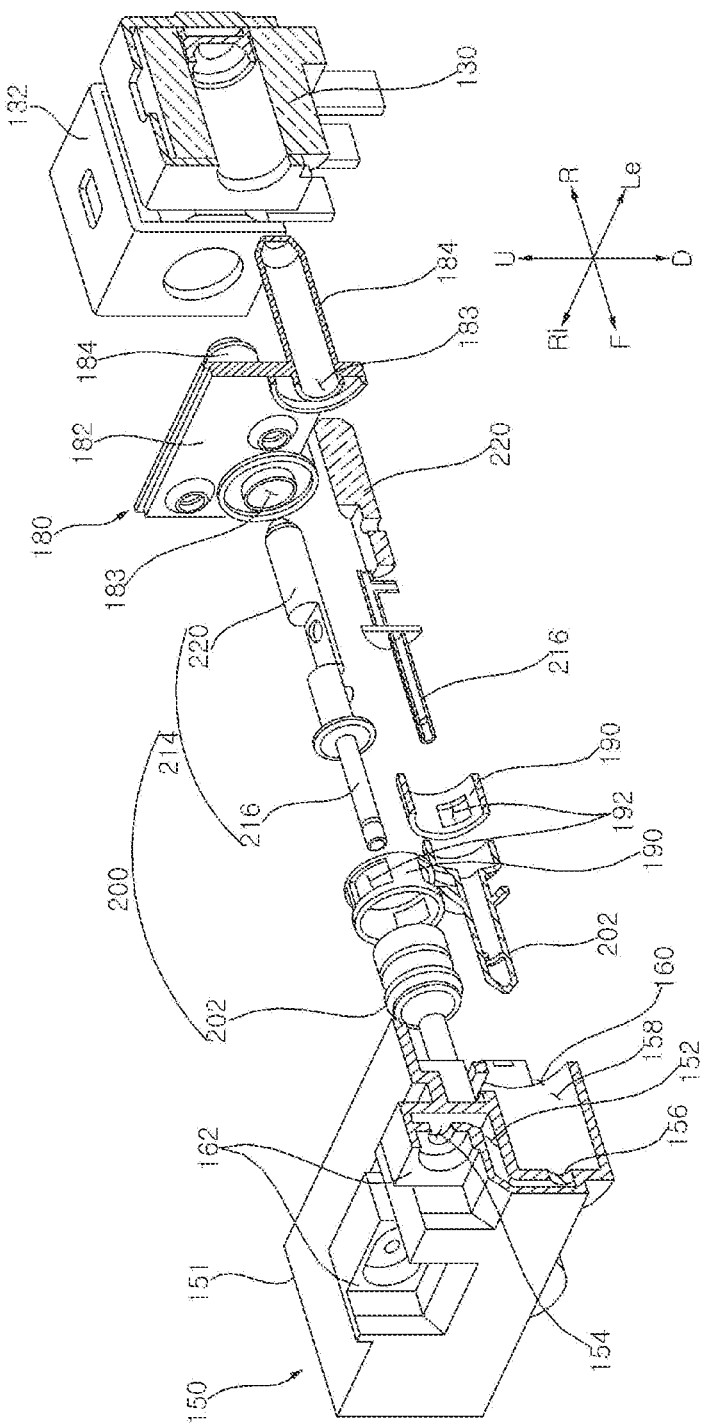
FIG. 9 is an exploded perspective view of a connector body, a valve, a connector cover, and a solenoid according to an embodiment of the present disclosure.

Referring to FIGS. 5 to 7, the case 102 has the cartridge space 104 in which the cartridge 230 is disposed, and a connector mounting part 114 which is disposed under the cartridge space 104 and to which the connector 150 is connected. The valve moving device 130 may be disposed on the outside of the a case 102 where the connector mounting part 114 is formed.

The cartridge space 104 is greater than a space formed by the connector mounting part 114. The cartridge space 104 is disposed over the connector mounting part 114. The cartridge space 104 may have a size capable of accommodating the cartridge 230.

The case 102 may include a rear wall 106 disposed to face the door 10, an upper wall 108 covering the top of the cartridge space 104, both sidewalls 110 extending forward from both ends of the rear wall 106, and a lower wall 112 covering the bottom of the cartridge 230 or the connector 150. The case 102 has an open front. Accordingly, the cartridge 230 and the connector 150 may be inserted or withdrawn through the open front of the case 102. A door locker 109 for fixing the position of the case door 140 may be formed at a front end of the upper wall 108.

The lower wall 112 extends forward from a lower end of a first wall of the connector mounting part 114 which will be described later. The lower wall 112 may extend obliquely in a forward and downward direction from a lower end of the first wall 116. Accordingly, when the detergent solution stored in the cartridge 230 may be discharged downward through the connector 150, the detergent solution may flow forward along the lower wall 112.

When the case door 140 is closed, the lower wall 112 may be spaced apart from the lower end of the case door 140. The separation space 144 spaced apart from the case door 140 may be formed at a front end of the lower wall 112. Accordingly, the detergent solution, flowing along the lower wall 112, may flow through the separation space 144 between the case door 140 and the case 102.

The connector mounting part 114 may protrude forward from the rear wall 106 or protrude inward from the both sidewalls 110. Accordingly, the cartridge 230 may be mounted on the connector mounting part 114.

The connector mounting part 114 may include a first wall 116 having at least one valve hole 118a, 118b, and 118c formed therein, and a pair of second walls 122 extending forward from both ends of the first wall 116 and having a fixing protrusion 124 for fixing the connector 150. The first wall 116 may have a plane parallel to the rear wall 106. The first wall 116 may be disposed to face the open front of the case 102.

At least one valve hole 118a, 118b, and 118c may be formed in the first wall 116. The first wall 116 includes cover housings 120a, 120b, and 120c defining a space in which the valve 200 is disposed, and extending to a rear side where the valve holes 118a, 118b, and 118c are formed.

Referring to FIGS. 6 and 7, the first wall 116 includes a plurality of valve holes 118a, 118b, and 118c which are horizontally spaced apart from each other. The first wall 16 includes a plurality of cover housings 120a, 120b, and 120c which are horizontally spaced apart from each other. The cover housings 120a, 120b, and 120c separate an area in which the valve 200 is disposed, from an area in which the valve moving device 130 is disposed. Accordingly, it is possible to prevent a detergent and the like, flowing through the valve 200, from entering the area in which the valve moving device 130 is disposed.

The valve moving device 130 may use a solenoid which changes the position of the valve 200 by magnetism. The valve moving device 130 may include a component capable of performing the function of attracting or repelling the valve 200 in a first direction. For example, the valve moving device 130 may also use a hydraulic device, e-mobility, and an elastic device. Hereinafter, a structure of the valve moving device 130 using the solenoid will be described with reference to the drawings.

The valve moving device 130 that changes the position of the valve 200 by magnetism is disposed around the cover housings 120a, 120b, and 130c. 1G When a current is applied, the valve moving device 130 generates a magnetic field to attract the valve 200 rearward. The valve moving device 130 may have a shape in which a plurality of coils are wrapped around the circumference of the cover housings 120a, 120b, and 120c. A terminal electrically connected to the outside may be disposed at one side of the valve moving device 130.

The detergent supply device 100 includes a solenoid cover 132 for fixing the position of the valve moving device 130 disposed around the cover housings 120a, 120b, and 120c. The solenoid cover 132 may cover the upper side and the rear side of the valve moving device 130. The solenoid cover 132 may be mounted to the case 102.

Figure 18:
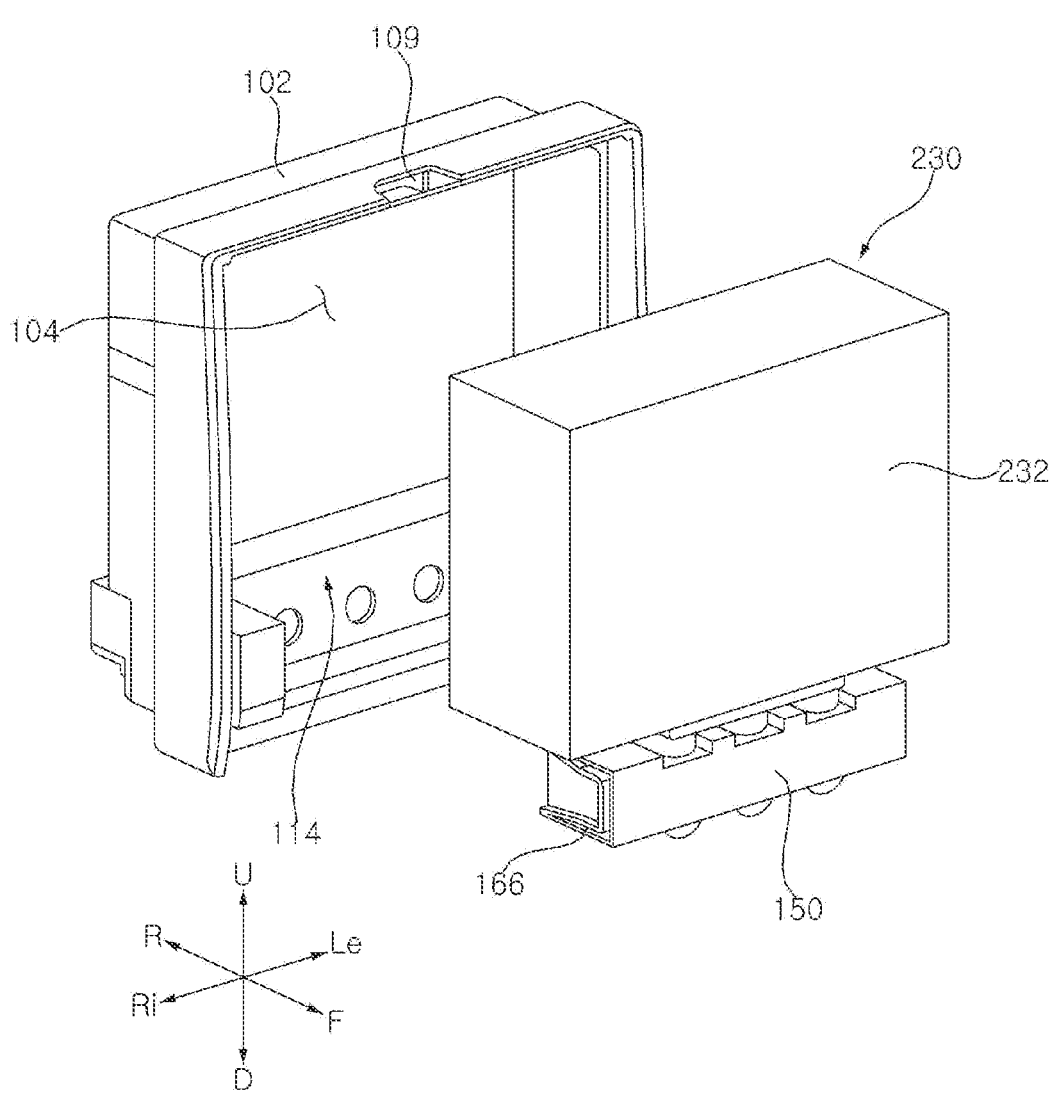
FIG. 18 is a perspective view explaining a coupling relationship between a discharge kit of a cartridge and a connector according to an embodiment of the present disclosure.
Figure 19:
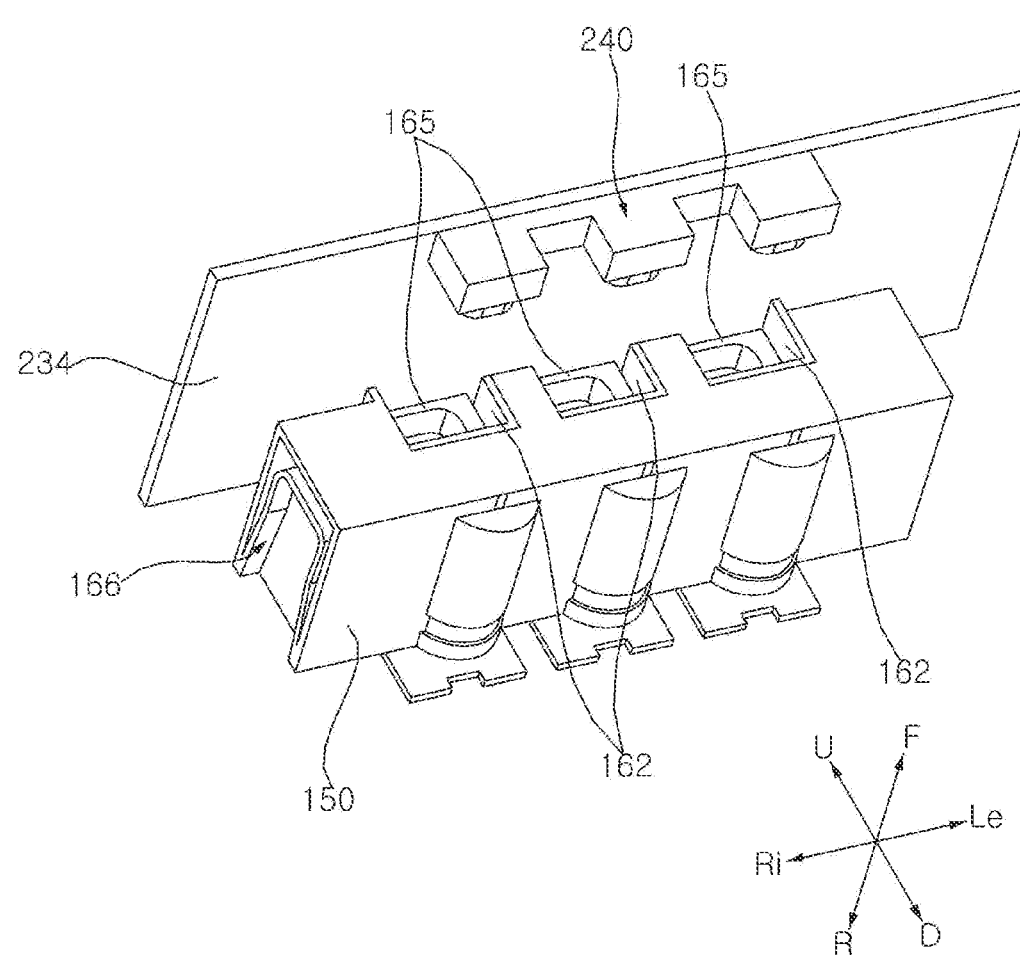
FIG. 19 is a cross-sectional view explaining a coupling relationship among a connector, a cartridge, a case, and a valve moving device.
Figure 20:
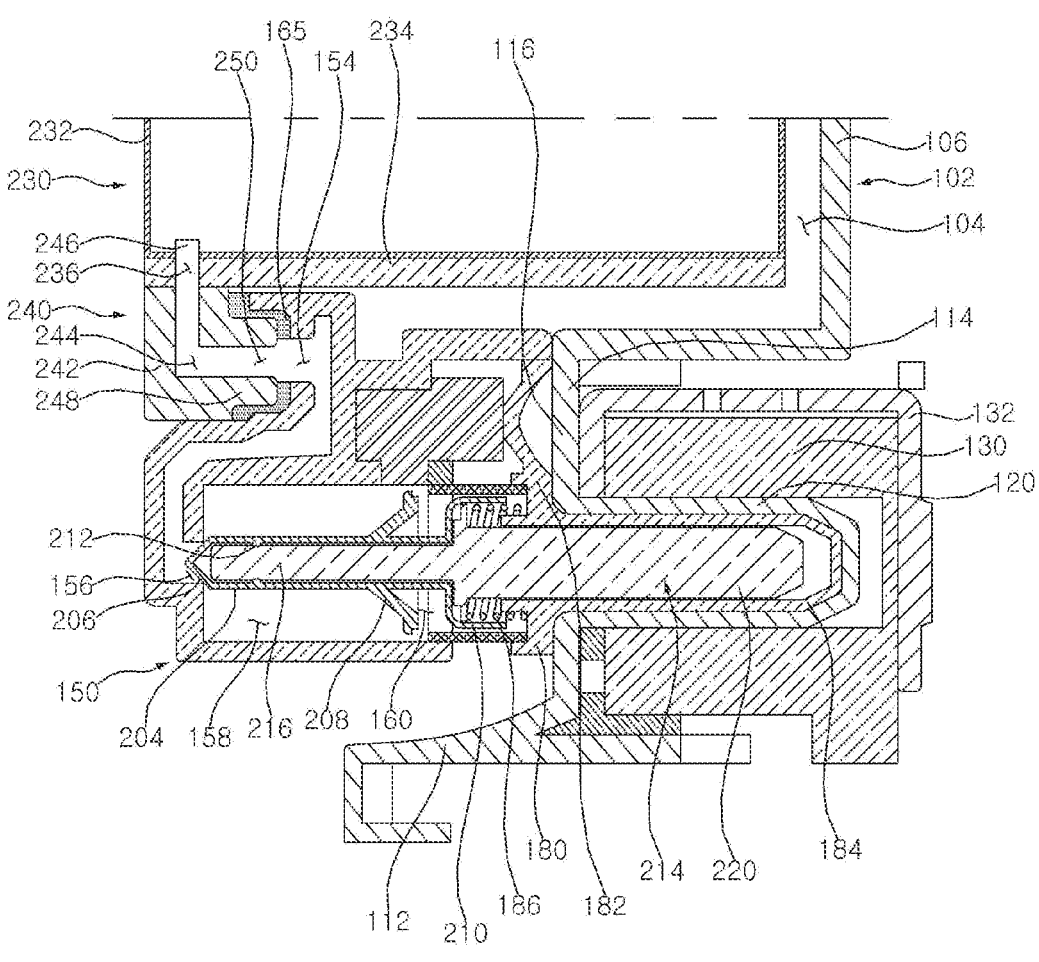

The connector 150 may be connected to the cartridge 230 and may be mounted on one side of the case 102. Referring to FIG. 18, the connector 150 is mounted to the connector mounting part 114 of the case 102. The connector 150 is connected to the cartridge 230 disposed over the connector 150.

The connector 150 may include the connector body 151 having the discharge chamber 158 formed therein in which an inner flow path 152, through which a detergent solution flows, and some components of the valve 200 are disposed, the connector cover 180 connected to the connector 150 and defining a space in which some components of the valve 200 are disposed, and the discharge connector 190 disposed between the connector body 151 and the a connector cover 180 and discharging a detergent solution, flowing from the discharge chamber 158, into the washing space of the cabinet 12.

The connector body 151 includes an inlet port 162 formed in an upper portion thereof and connected to an outlet port 240 of the cartridge 230.

Figure 11A:
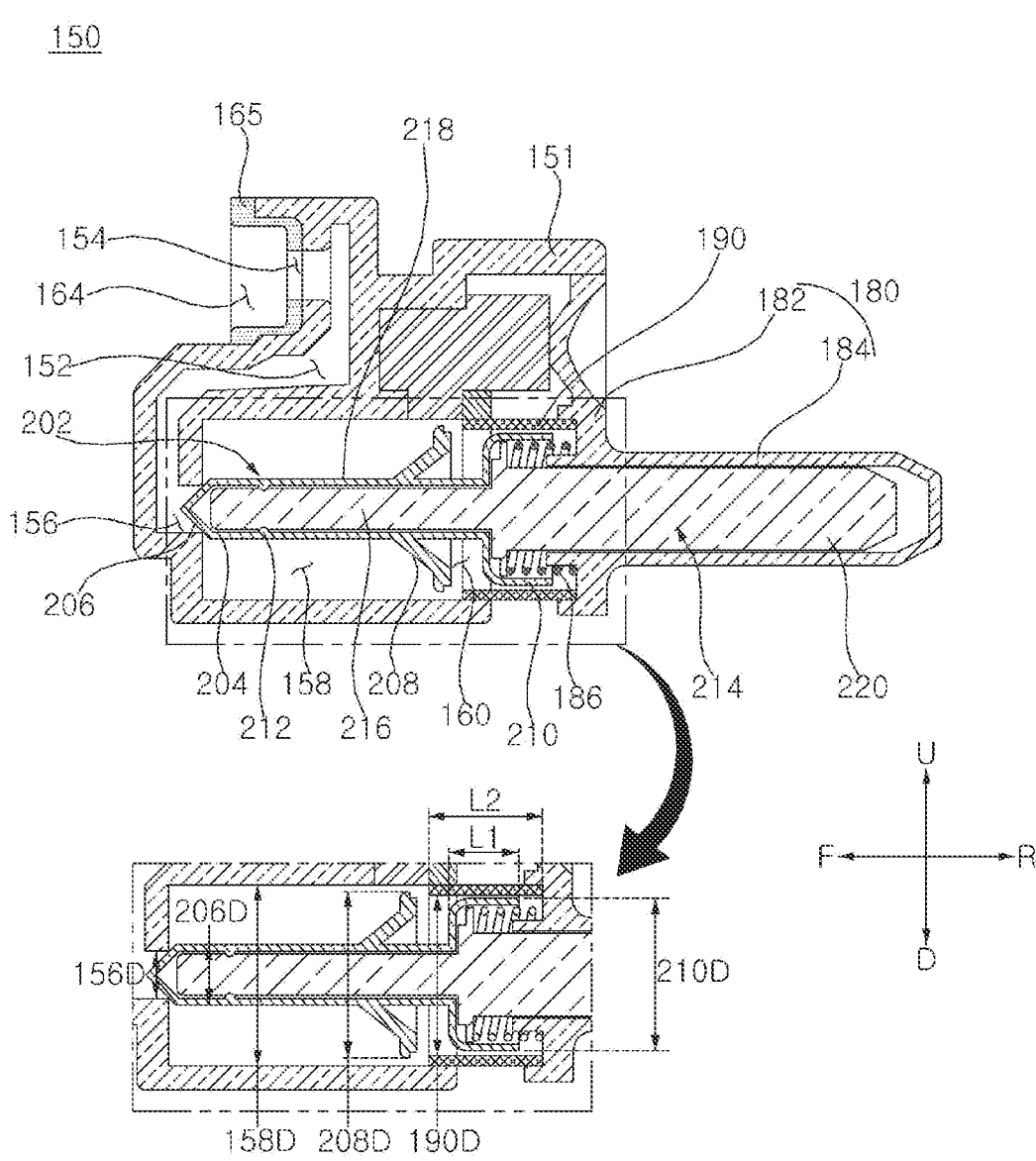
FIG. 11A is a cross-sectional view of a connector according to an embodiment of the present disclosure.
Figure 11B:
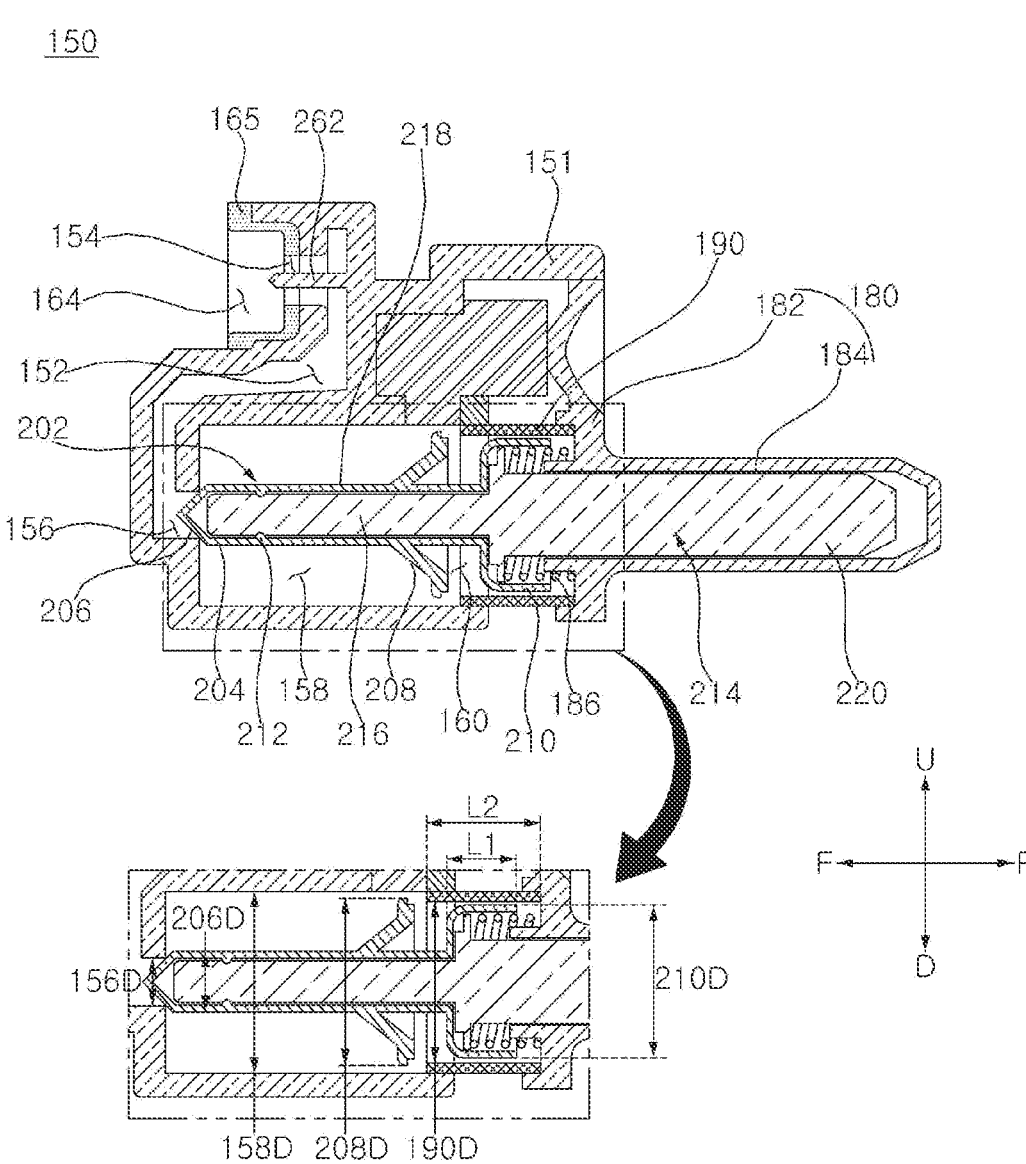
FIG. 11B is a cross-sectional view of a connector according to another embodiment of the present disclosure.

The inlet port 162 is formed in the upper portion of the connector 150. Here, the upper portion of the connector body 151 may be an area located at an upper end of the inner flow path 152 formed inside the connector 150. The upper portion of the connector 150 may include an upper surface of the connector body 151, and may also include a portion of a peripheral surface of the connector 150. Referring to FIGS. 11A and 11B, the inlet port 162 is formed in an upper portion of a front surface of the connector 150.

The outlet port 240 of the cartridge 230, which will be described below, is mounted in the inlet port 162. The inlet port 162 has a mounting recess 164 in which the outlet port 240 of the cartridge 230 is mounted.

The inlet port 162 has an inlet 154 which is formed at an end of the mounting recess 164, and through which the detergent solution, discharged from the cartridge 230, flows into the inner flow path 152. A rubber 165 that seals a space between the outlet port 240 and the connector 150 may be formed in the mounting recess 164.

The mounting recess 164 forms a space in which a port exit 248 of the outlet port 240 is inserted. The inlet 154 is formed in the mounting recess 164 at a position corresponding to an outlet 250 of the outlet port 240.

The inner flow path 152 for supplying the detergent solution, introduced through the inlet 154, to the discharge chamber 158 is formed inside the connector body 151.

Referring to FIG. 11A, separate pin is not disposed on the connector body 151. In this case, a user may directly remove a hole cover disposed on the outlet port 240 of the cartridge 230, to connect the cartridge 230 to the connector 150. Referring to FIG. 11B, in another example, a pin 262 protruding from an inner surface of the inner flow path 152 toward the inlet 154 may be disposed on the connector body 151b. The pin 262 may be spaced radially inward from an inner circumferential surface of the inlet 154, and may protrude to the outside of the connector body 151 having mounting recess 164 formed therein. Accordingly, when the cartridge 230 is mounted in the inlet port 162, a hole cover (not shown) of the outlet port 240 of the cartridge 230 may be opened.

Referring to FIGS. 11A and 11B, the inner flow path 152 forms a flow path through which the detergent solution flows downward. A first discharge hole 156 is formed at a lower end of the inner flow path 152 so as to communicate with the discharge chamber 158. In the inner flow path 152, the inlet 154 is disposed above the first discharge hole 156, such that the detergent solution introduced through the inlet 154 may flow to the first discharge hole 156 by gravity.

The discharge chamber 158 forms a space for temporarily storing and discharging the detergent solution discharged from the inner flow path 152. The discharge chamber 158 includes a valve 200 that linearly reciprocates therein. The discharge chamber 158 is formed in a front-rear direction. The discharge chamber 158 may have a cylindrical structure with a diameter greater than a diameter 156D of the first discharge hole 156.

The discharge chamber 158 communicates at one side with the inner flow path 152 through the first discharge hole 156. The discharge chamber 158 has a second discharge hole 160 which is formed at an opposite side of the first discharge hole 156, and through which the detergent solution present in the discharge chamber 158 is discharged. The second discharge hole 160 may be opened in a direction opposite to a direction in which the first discharge hole 156 is formed. The detergent solution present in the discharge chamber 158 may flow to the discharge connector 190, which will be described below, through the second discharge hole 160 in the discharge chamber 158.

Figure 10:
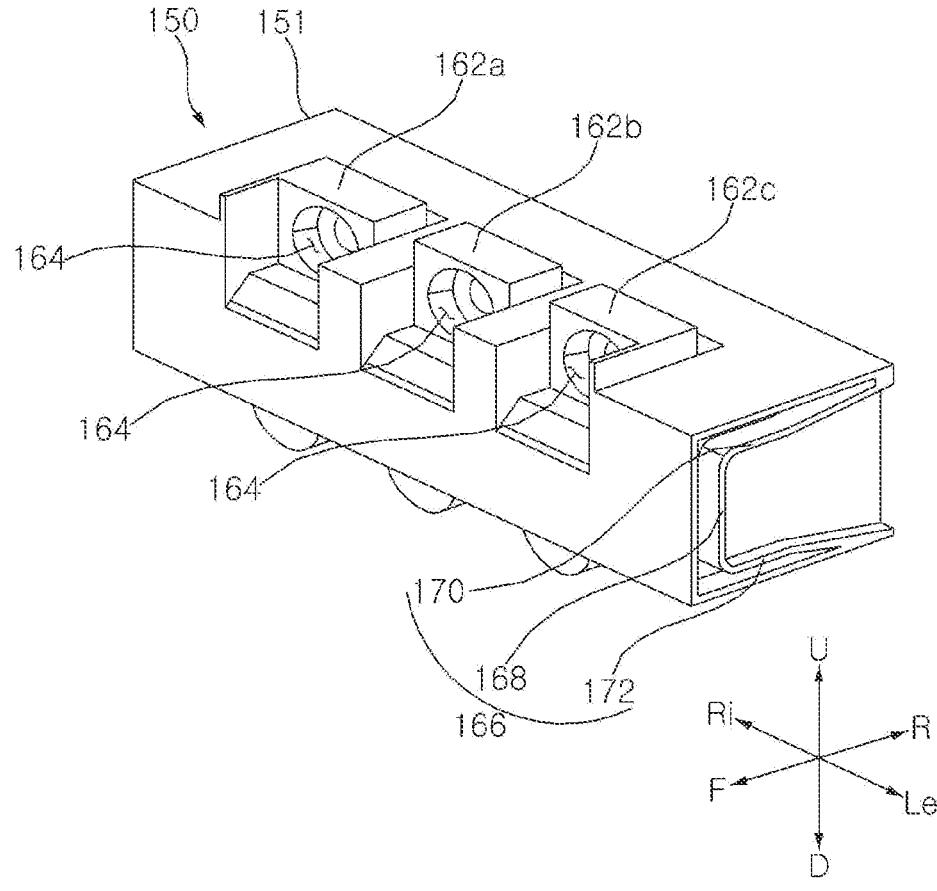
FIG. 10 is a perspective view of a connector according to an embodiment of the present disclosure.
Figure 13:
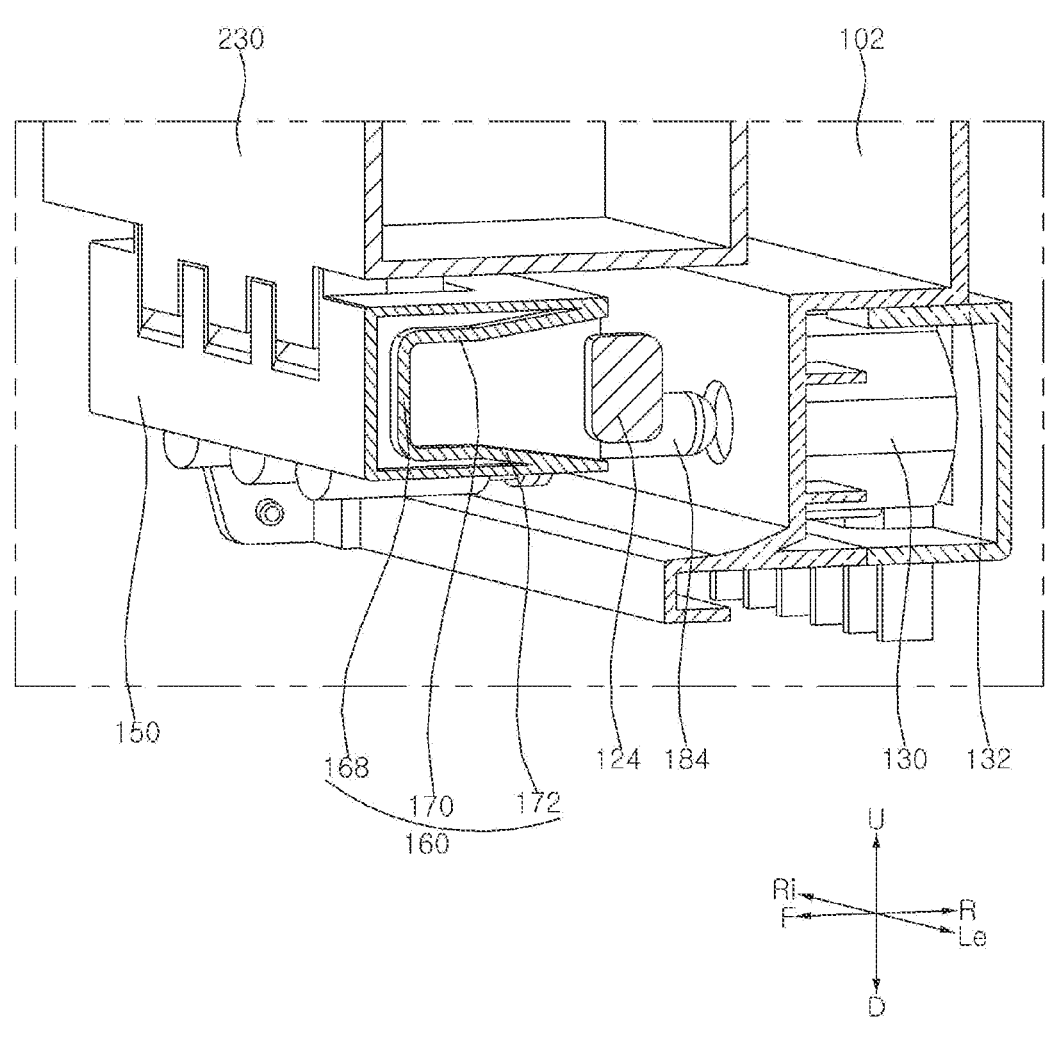
FIG. 13 is a cross-sectional perspective view of one side of a case and a connector for explaining a coupling relationship between a connector and a case of the present disclosure.

Referring to FIGS. 10 and 13, the connector body 151 includes a holder 166 disposed on both sides thereof and fixed to the fixing protrusion 124 of the case 102. The holder 166 may be disposed on both sides of the connector 150, and may surround the fixing protrusion 124. The holder 166 is opened in a direction in which the connector 150 is inserted, and surrounds the circumference of the fixing protrusion 124 in the remaining three directions.

Figure 14:
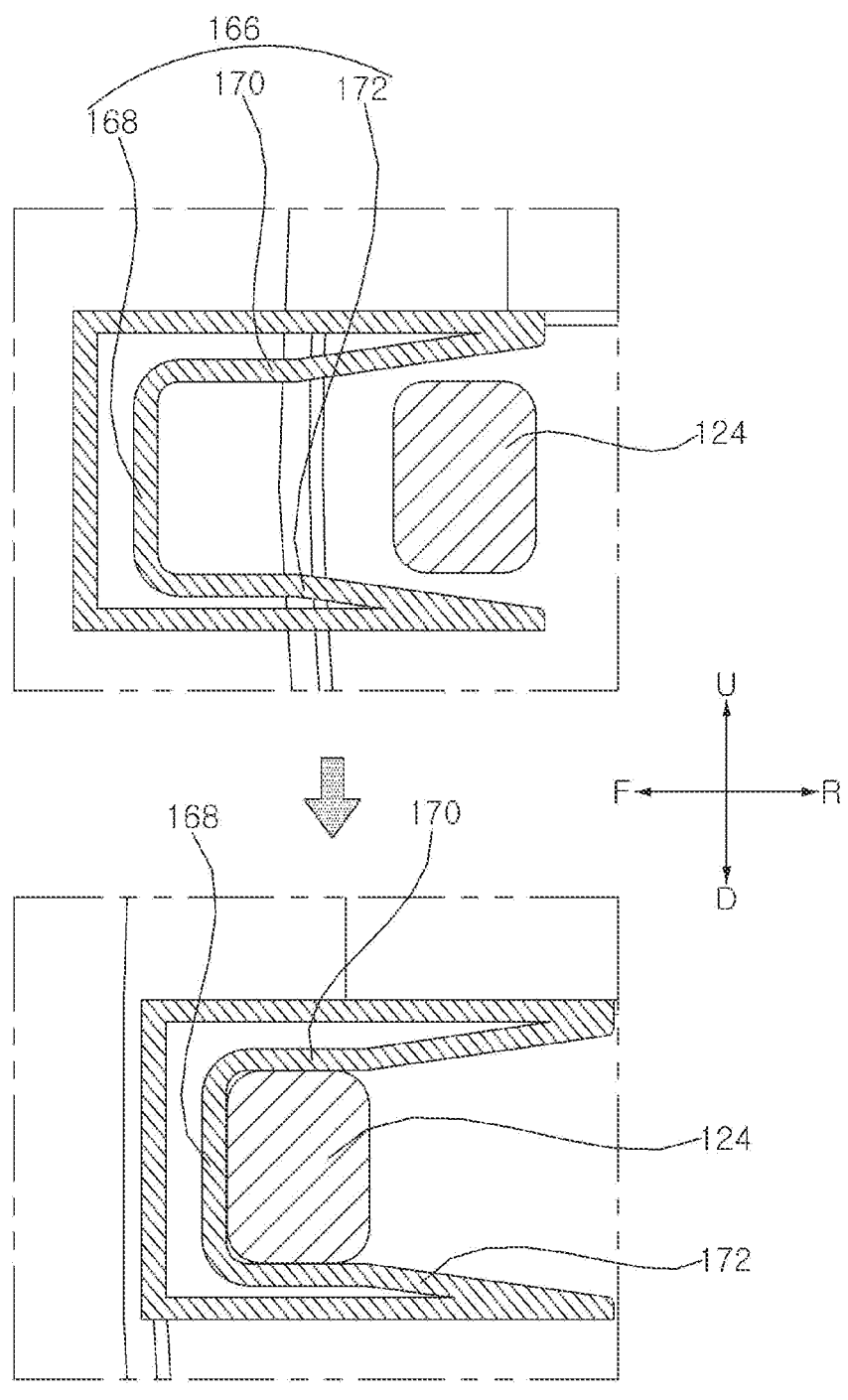
FIG. 14 is a diagram explaining a mounting relationship between a fixing protrusion and a holder according to an embodiment of the present disclosure.

The holder 166 may protrude in both directions from both sides of the connector 150. Referring to FIG. 14, the holder 166 may be disposed to surround the fixing protrusion 124. The holder 166 is opened in a direction toward the case 102, and surrounds the fixing protrusion 124 in the remaining three directions. Referring to FIG. 14, the holder 166 may include a first rib 168 disposed to face the fixing protrusion 124 a second rib 170 bent from one end of the first rib 168, and a third rib 172 bent from another end of the first rib 168, when the connector 150 is mounted in the case 102.

The second rib 170 and the third rib 172 may be disposed to face each other. Each of the second rib 170 and the third rib 172 may be disposed perpendicular to each other with respect to the first rib 168. The second rib a 170 and the third rib 172 may become closer to each other toward the first rib 168. That is, the fixing protrusion 124 may be smoothly inserted into the holder 166, and when fully inserted, a position of the fixing protrusion 124 may be fixed by the second rib 170 and the third rib 172.

Referring to FIG. 14, the first wall 116 may come into contact with the fixing protrusion 124 to limit rearward movement of the connector 150. Referring to FIG. 14, the fixing protrusion 124 may be press-fitted between the second rib 170 and the third rib 172, such that its position may be fixed.

The fixing protrusion 124 of the case 102 and the holder 166 of the connector 150 may be formed in different structures.

Figure 15:
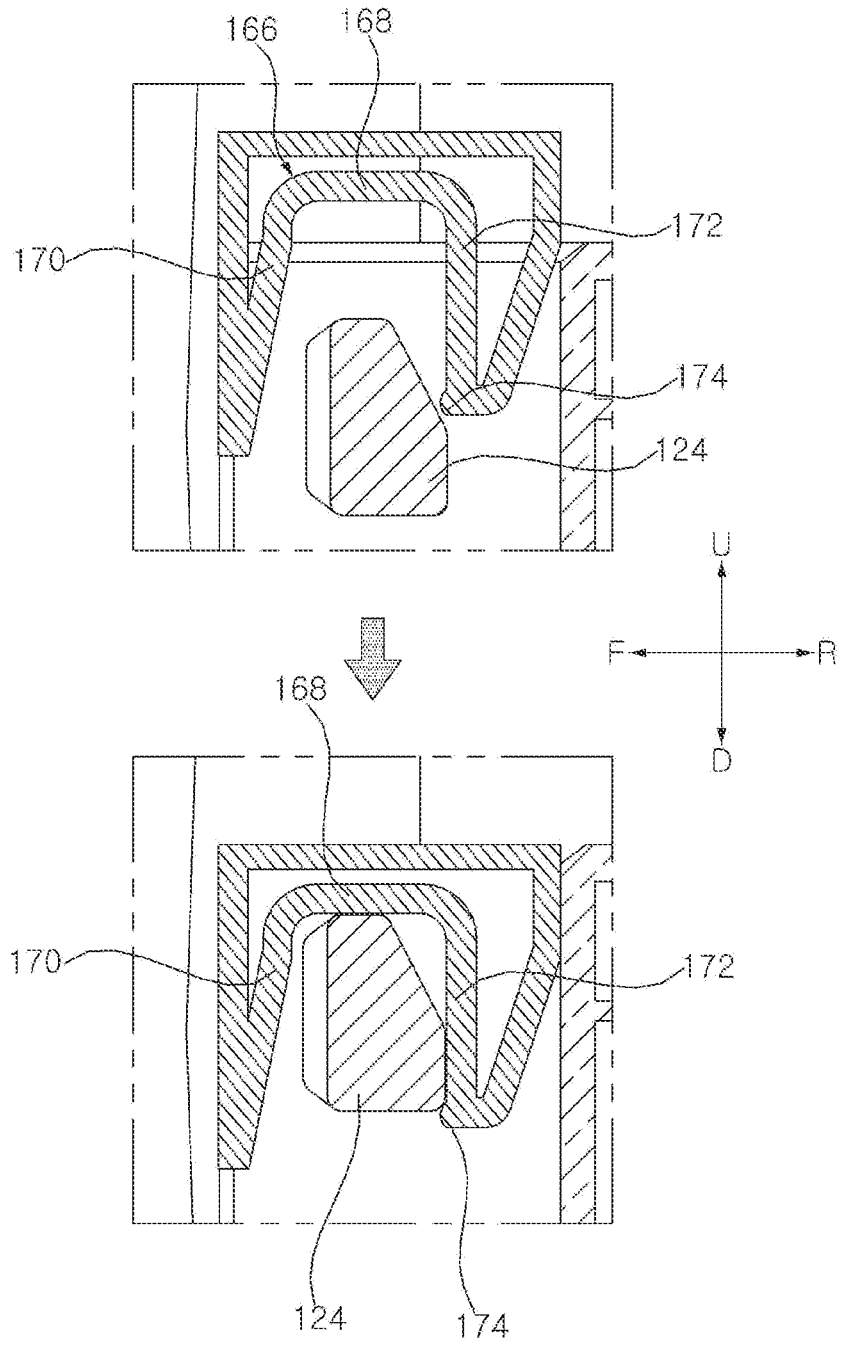

Referring to FIG. 15, in another example, the connector 150 may be inserted into or withdrawn from the case 102 in a vertical direction. Referring to FIG. 15, the holder 166 may be opened at the bottom side, and the top, front, and rear sides thereof may surround the fixing protrusion 124.

The holder 166 may include the first rib 168 disposed to face the fixing protrusion 124, the second rib 170 bent from one end of the first rib 168, and the third rib 172 bent from another end of the first rib 168, when the connector 150 is mounted in the case 102. The first rib 168 may come into contact with the fixing protrusion 124 to limit rearward movement of the connector 150.

The second rib 170 and the third rib 172 may be disposed to face each other. The second rib 170 may be formed perpendicular to the first rib 168. The third rib 172 may be inclined with respect to the first wall 116. A distance between the second rib 170 and the third rib 172 may decrease toward the first rib 168.

Referring to FIG. 15, a protrusion 174, protruding toward the fixing protrusion 124, may be formed at an end of the second rib 170. A surface of the fixing protrusion 124, which comes into contact with the second rib 170, may be inclined so that the fixing protrusion 124 has a cross-sectional area that decreases toward the top.

Figure 12:
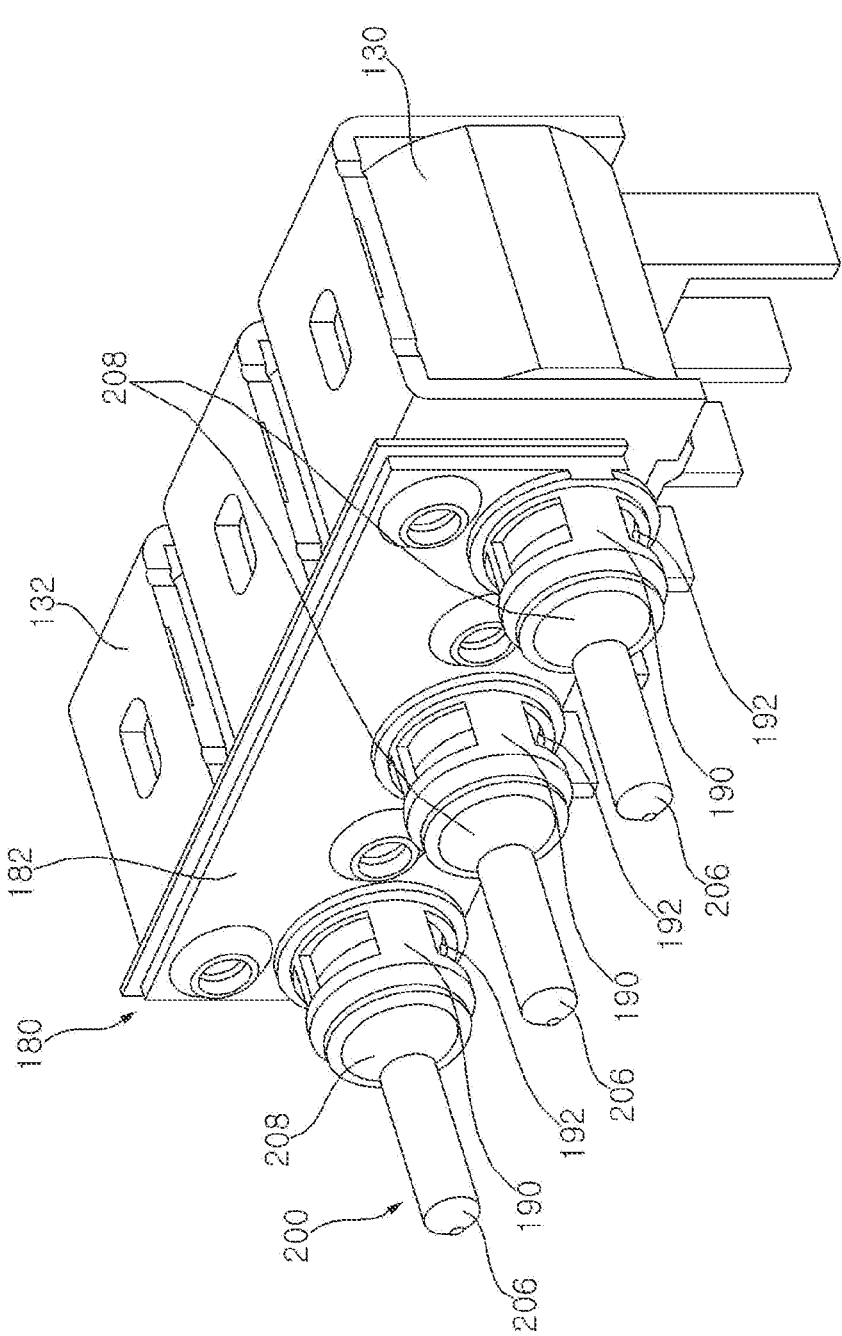
FIG. 12 is an assembled perspective view of a valve, a connector cover, and a valve moving device according to an embodiment of the present disclosure.

Hereinafter, the connector cover 180 and the discharge connector 190 will be described with reference to FIGS. 11A to 12.

The connector cover 180, while being coupled to the connector body 151, may be mounted in the case 102. As a portion of the connector cover 180, which accommodates some components of the valve 200, is inserted into the valve moving device 130, the area in which the valve moving device 130 is disposed and the area in which the valve 200 is disposed may be separated by the connector cover 180.

The connector cover 180 separates a space in which the valve 200 moves from the area in which the valve moving device 130 is disposed.

The connector cover 180 may be connected at one side to the connector and may define a space in which some components of the valve 200 are disposed. The connector cover 180 may define a space in which some components of the valve 200 are disposed. The connector cover 180 includes a cover plate 182 disposed to face the case 102 and connected to the connector 150, and a valve housing 184 inserted into the valve moving device 130 and defining a space in which the valve 200 is disposed. The valve housing 184 is inserted into the cover housings 120a, 120b, and 120c, and defines a space in which the valve 200 is disposed. The valve housing 184 may separate a space in which the valve 200 is disposed from a space in which the valve moving device 130 is disposed. The valve housing 184 may separate a space in which the valve 200 is disposed from a space in which the case 102 is disposed. Accordingly, an area in which the valve 200 that opens and closes the discharge chamber 158 is disposed may be separated from the case 102.

The cover plate 182 may be connected to the connector body 151. The cover plate 182 may be disposed to contact the rear wall 106 of the case 102. An elastic member 186, which applies elastic force to the valve 200 in a direction toward the first discharge hole 156, may be disposed on the cover plate 182.

Referring to FIG. 11A, a spring may be used as the elastic member 186. A first side of the elastic member 186 may contact the cover plate 182, and a second side thereof contacts the valve 200, thereby applying a force to the valve 200 in a second direction. Here, the second direction may be a front direction in FIG. 11A and a direction in which the valve 200 is moved by the elastic force of the elastic member 186. The second direction may be an opposite direction of the first direction in which the valve 200 is moved by the valve moving device 130. Referring to FIG. 11A, the first direction may be a direction in which the valve moving device 130 is disposed with respect to the discharge connector 190, and may be a rear direction in FIG. 11A. The second direction may be a direction in which the discharge chamber 158 is disposed with respect to the discharge connector 190.

Accordingly, when the valve moving device 130 is not in operation, the elastic member 186 may apply force to the valve 200 in the second direction, and the valve 200 may close the first discharge hole 156.

The discharge connector 190 is disposed between the connector cover 180 and the connector body 151. The discharge connector 190 is disposed at a a discharge end of the discharge chamber 158. Accordingly, when the second discharge hole 160 of the discharge chamber 158 is opened by the valve 200, a detergent solution present in the discharge chamber 158 may flow to the discharge connector 190.

The discharge connector 190 may have a cylindrical shape with a hollow inner portion. An inner diameter 190D of the discharge connector 190 is smaller than an inner diameter 158D of the discharge chamber 158. Accordingly, when the valve 200 is moved by the valve moving device 130 in the first direction, a second cap 208 of the valve 200 comes into contact with the discharge connector 190, to close the second discharge hole 160 of the discharge chamber 158.

A third discharge hole 192, through which the detergent solution flowing from the discharge chamber 158 is discharged, is formed in a circumferential surface of the discharge connector 190. A plurality of third discharge holes 192 may be circumferentially spaced apart from each other in the circumferential surface of the discharge connector 190.

Hereinafter, the valve will be described with reference to FIGS. 9 to 11B.

The valve 200 is disposed so as to be movable forward and rearward in the discharge chamber 158 formed in the connector 150. The valve 200 is movably disposed in the valve housing 184 of the connector cover 180. The valve 200 is movably disposed in the cover housings 120a, 120b, and 120c of the case 102.

Depending on arrangement, the valve 200 may allow the discharge chamber 158 and the cartridge 230 to communicate with each other or allow the discharge chamber 158 and the outside of the connector 150 to communicate a with each other. Here, the valve 200 allowing the discharge chamber 158 and the cartridge 230 to communicate with each other may include allowing the discharge chamber 158 and the cartridge 230 to directly communicate with each other, as well as allowing the discharge chamber 158 and the cartridge 230 to communicate with each other indirectly through the inner flow path 152 disposed therebetween.

The valve 200 may open and close the first discharge hole 156 formed between the discharge chamber 158 and the inner flow path 152. The valve 200 may open and close the second discharge hole 160 of the discharge chamber 158. When the valve moving device 130 operates, the valve 200 may move in the first direction in which the valve moving device 130 is disposed. When the valve moving device 130 is not in operation, the valve 200 may move in the second direction opposite to the first direction.

The valve 200 includes a valve body 202 disposed in the discharge chamber 158 and opening and closing the first discharge hole 156 or the second discharge hole 160, and a valve mover 214 connected to the valve body 202 and moving the position of the valve body 202 by the valve moving device 130.

Depending on position, the valve body 202 may close the first discharge hole 156 or close the second discharge hole 160 of the discharge chamber 158.

The valve body 202 includes a first cap 206 opening and closing the first discharge hole 156, and a second cap 208 opening and closing the second discharge hole 160. The valve body 202 includes an elastic member cover 210 defining a space in which the elastic member 186 is disposed. The valve body 202 includes an outer rod 205 formed in a front-rear direction in which the discharge chamber 158 extends.

The outer rod 204 may be formed in a bar shape elongated in the front-rear direction and having a hollow inner portion. The outer rod 204 may define an internal space therein into which the valve mover 214 is inserted. An inner rod 216 of the valve mover 214, which will be described below, may be inserted into the internal space of the outer rod 204, such that the valve body 202 may be coupled to the valve mover 214. An inner protrusion 212 fixing the position of the inner rod 216, inserted into the outer rod 204, may be formed on an inner circumferential surface of the outer rod 204. The inner protrusion 212 is inserted into an inner rod groove 218 of the inner rod 216 which will be described below, thereby fixing the position of the inner rod 216 inserted into the outer rod 204.

The first cap 206 is disposed at an end of the outer rod 204. A diameter 206D of the first cap 206 is greater than a diameter 156D of the first discharge hole 156.

The second cap 208 extends in a circumferential direction of the outer rod 204. The second cap 208 is spaced apart form the first cap 206 in the front-rear direction. The second cap 208 may have a conical shape that extends radially outwardly from the circumference of the outer rod 204 and in the first direction.

An end portion of the second cap 208 that faces the discharge connector 190 may be formed in a step shape. Accordingly, when the second cap 208 comes into contact with the discharge connector 190, the second discharge hole 160 may be closed.

Referring to FIG. 11A, the second cap 208 may extend from the a circumference of the outer rod 204 in an outward direction and in a rearward direction toward the discharge connector 190. A diameter 208D of an outer circumferential end of the second cap 208 is greater than a diameter 190D of an inner circumferential end of the discharge connector 190. The diameter 208D of the outer circumferential end of the second cap 208 is smaller than the diameter 158D of an inner circumferential surface of the discharge chamber 158.

The elastic member cover 210 may be spaced rearward from the second cap 208. The elastic member cover 210 may have a bowl shape that is open in the second direction.

The valve mover 214 is disposed in the elastic member cover 210. The elastic member 186 may be disposed between the elastic member cover 210 and the valve mover 214. The elastic member cover 210 may be radially spaced apart from the valve mover 214 disposed therein. Accordingly, the elastic member 186 may be disposed in a space spaced apart from the valve mover 214 in a radial direction of the elastic member cover 210.

The elastic member cover 210 protrudes radially outwardly from the circumferential surface of the outer rod 204, and then is bent to extend in the first direction. A length L1 of the elastic member cover 210 that extends in the first direction is shorter than a length L2 of the discharge connector 190.

The elastic member 186 is disposed to come into contact with each of the cover plate 182 of the connector cover 180 and the elastic member cover 210. The connector cover 180 is fixedly disposed, such that the elastic member cover 210 may be moved in the second direction by the elastic force of the elastic member 186.

The elastic member cover 210 is disposed so as to be movable inside the a discharge connector 190. Accordingly, a diameter 210D of an outer circumferential end of the elastic member cover 210 is smaller than the diameter 190D of the inner circumferential end of the discharge connector 190, The discharge connector 190 may guide linear movement of the elastic member cover 210.

The valve mover 214 includes the inner rod 216 inserted into the outer rod 204 and connected to the valve body 202, and a flinger 220 connected to the inner rod 216, with a position of the flinger 220 being changed by operation of the valve moving device 130. The inner rod 216 is inserted into the outer rod 204. The inner protrusion 212 of the outer rod 204 is inserted into the inner rod groove 218 formed in the inner rod 216, thereby fixing the position of the inner rod 216 inserted into the outer rod 204.

The flinger 220 may be connected to the inner rod 216 and may extenid from the inner rod 216 in the first direction. The flinger 220 may be made of a material responsive to the magnetic force generated by the valve moving device 130. The flinger 220 is made of a steel material and may be changed in position by a magnetic force generated by the solenoid 130. That is, the flinger 220 may be moved in the first direction by the magnetic force generated when power is applied to the solenoid 130. In this case, the inner rod 216 connected to the flinger 220 may move in the first direction together with the valve body 202 connected to the inner rod 216.

The cartridge 230 may include a cartridge body 232 accommodating a detergent solution, and an outlet port 240 which is connected to the cartridge body 232 and through which the detergent solution stored in the cartridge body 232 is discharged to the outside. The cartridge 230 may include a support plate 234 disposed at the bottom of the cartridge body 232 and having a fixed shape.

The cartridge body 232 may be disposed on the support plate 234. The cartridge body 232 may be disposed on the support plate 234 using an adhesive and the like.

The cartridge body 232 may be made of a vinyl material which may be easily changed in shape. The cartridge body 232 is changed in shape so that an internal volume thereof may decrease as the amount of the detergent solution stored therein decreases.

The cartridge body 232 may be made of vinyl having a thickness of 0.05 mm to 0.1 mm. The cartridge body 232 may be made of vinyl of HDPE and PP material. The cartridge body 232 may be made of a flexible material. Accordingly, as the amount of the detergent solution in the cartridge body 232 decreases, the shape of the cartridge body 232 may be changed.

As described above, the cartridge body 232 is made of a thin material, the amount of the detergent solution present in the cartridge body 232 may increase. The cartridge body 232 is made of a material that may be changed in shape, such that as the amount of the detergent solution stored therein is reduced, the shape of the cartridge body may be changed to a size corresponding to the reduced volume.

The cartridge body 232 may include a partition wall 233 dividing the space in which the detergent solution is stored. The partition wall 233 may also be made of the same deformable material as the cartridge body 232.

Figure 21A:
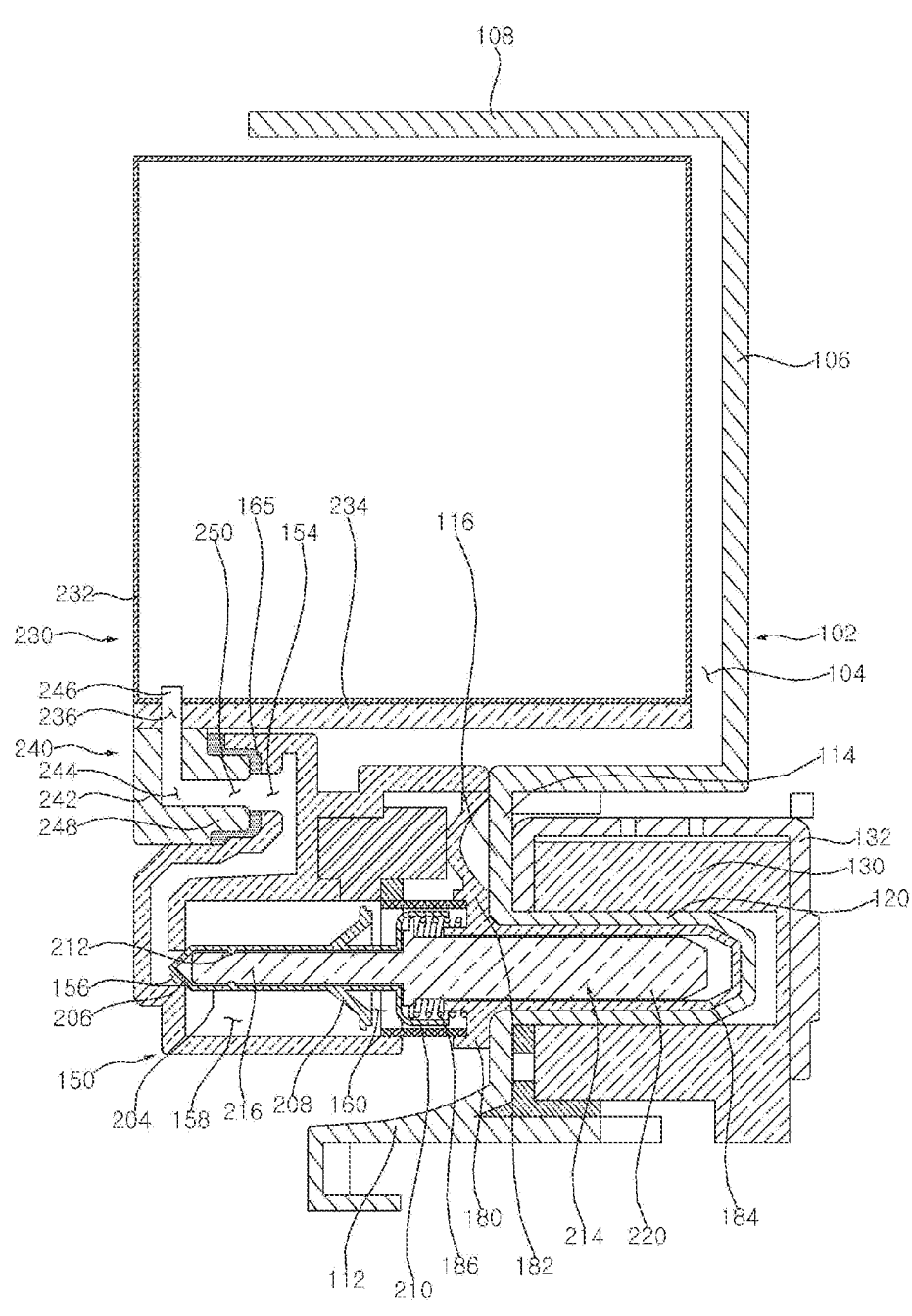
Figure 21B:
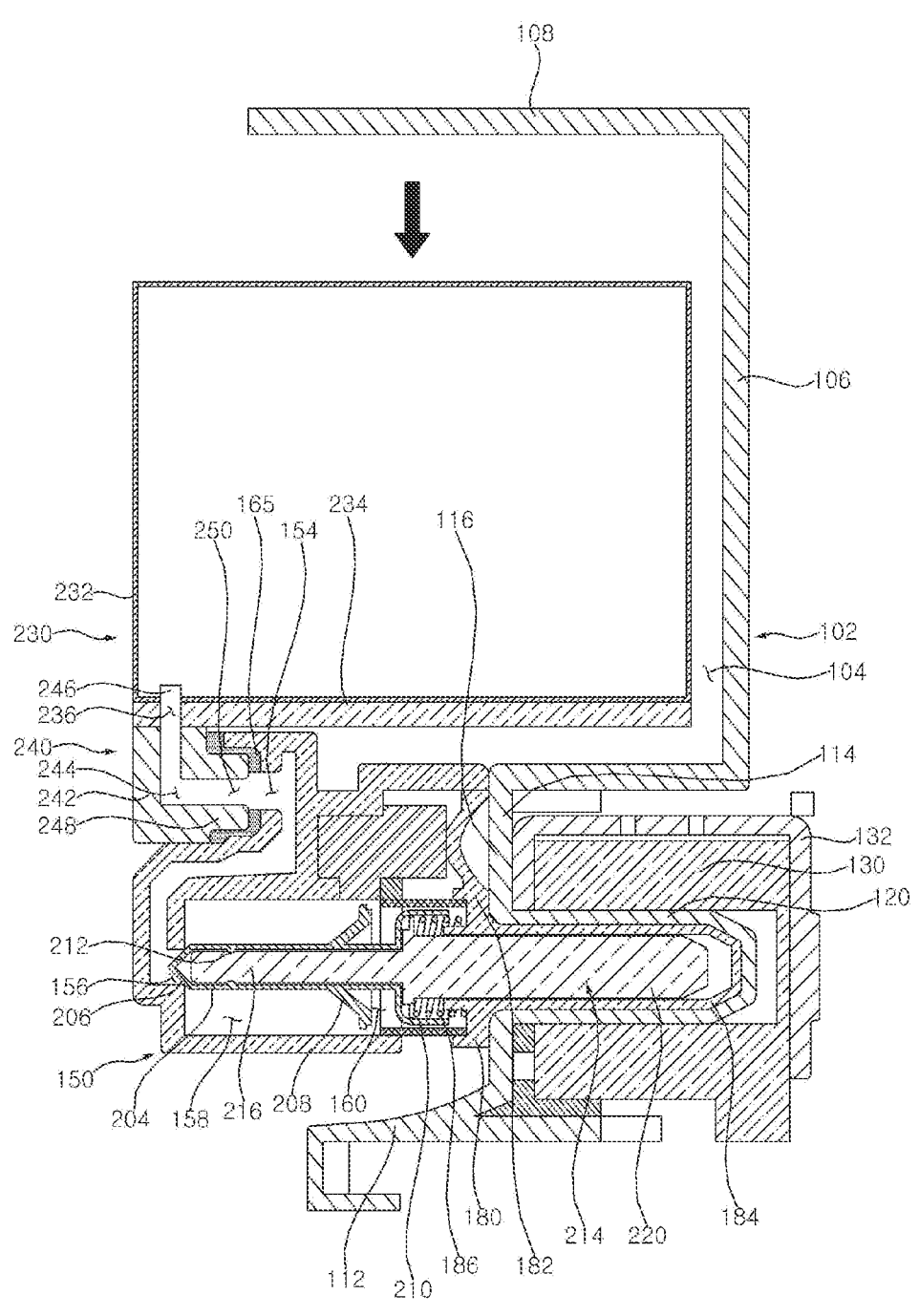
Figure 22:
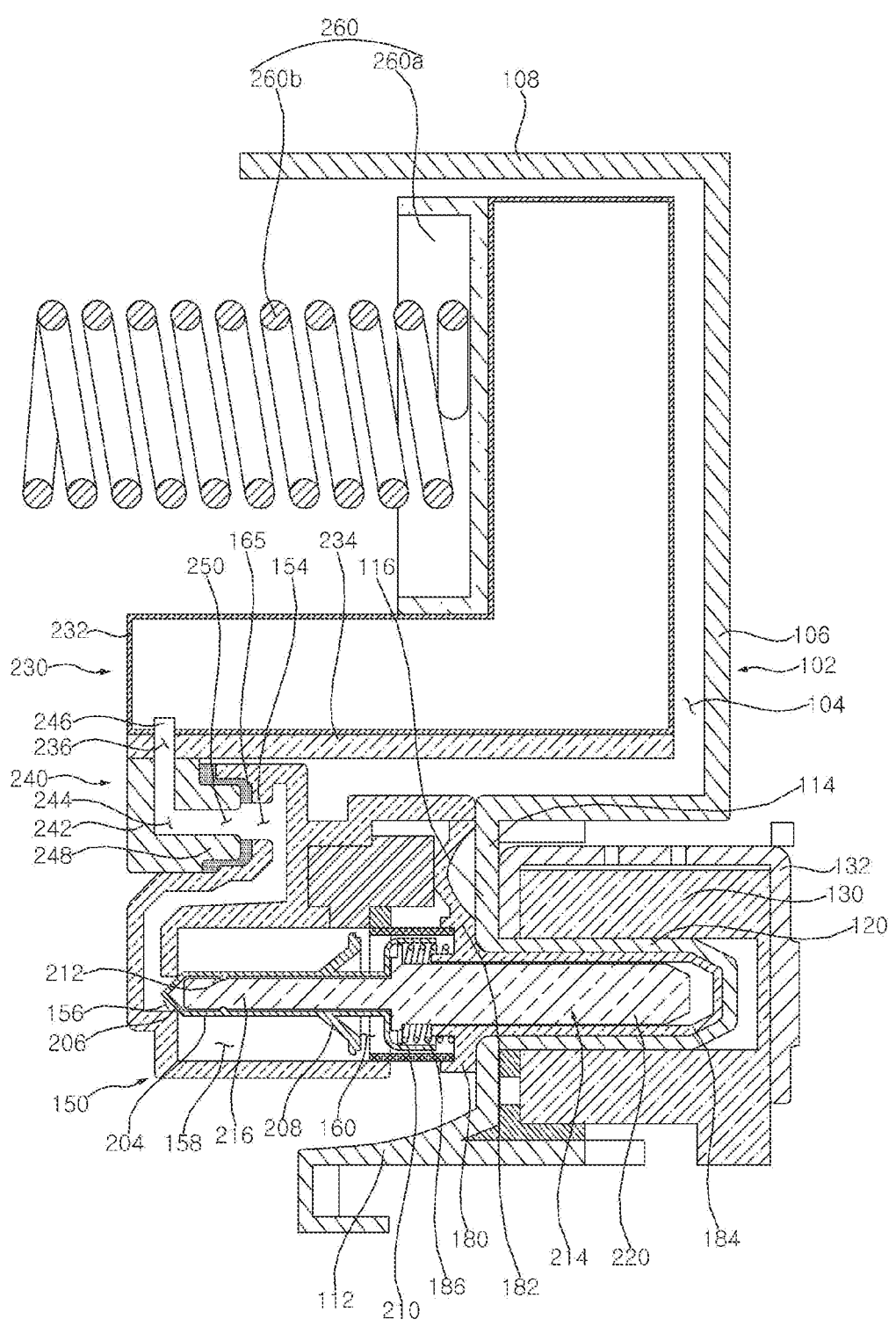
FIG. 22 is a cross-sectional view explaining a structure of discharging a a detergent solution stored in a cartridge, according to another embodiment of the present disclosure.

Accordingly, referring to FIGS. 21A and 21B, the cartridge body 232 is changed in shape in which as the amount of the detergent solution stored in the cartridge body 232 is reduced, an upper end of the cartridge body 232 is lowered. In addition, as illustrated in FIG. 22, if there is a separate component for applying pressure, the shape of the cartridge body 232 may be changed by the pressure.

Figure 16:
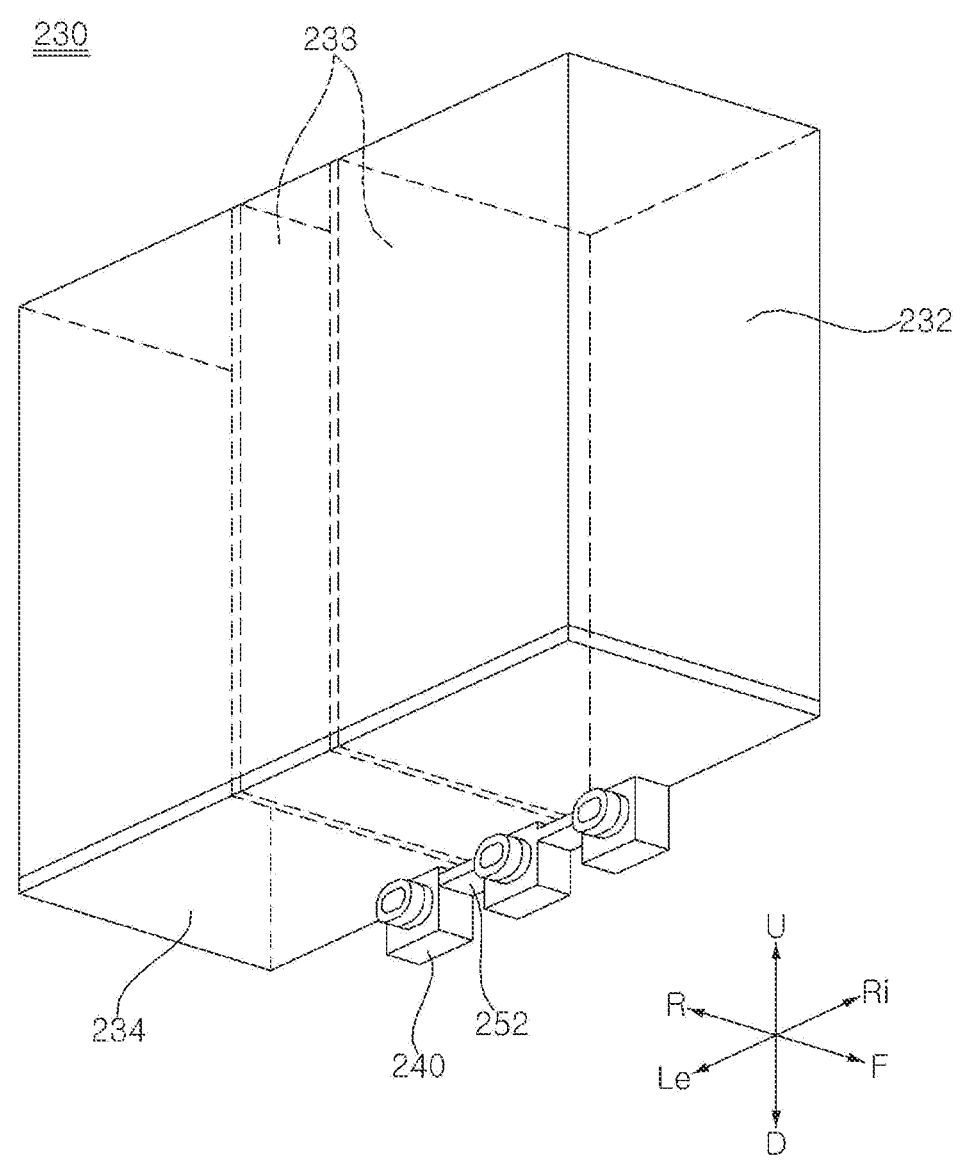
FIG. 16 is a perspective view of a cartridge according to an embodiment of the present disclosure.
Figure 17:
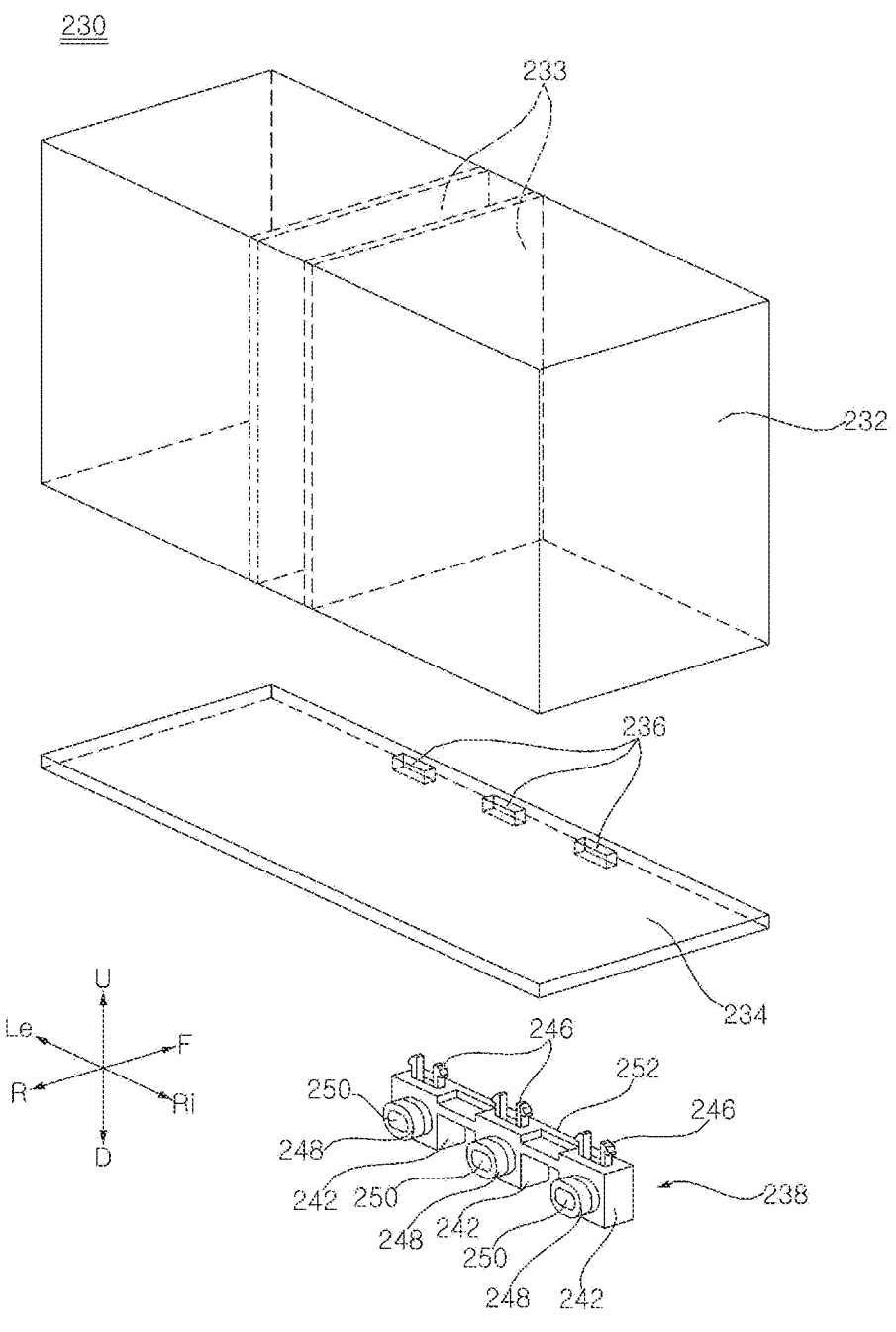
FIG. 17 is a perspective view explaining a relationship in which a connector coupled to the cartridge is mounted to the case, according to an embodiment of the present disclosure.

The inside of the cartridge body 232 may be divided into a plurality of regions. The cartridge body 232 may be divided into a plurality of regions so that different liquid detergents may be stored separately. Referring to FIGS. 16 and 17, a discharge kit 238 includes three port bodies 242, such that the inside of the cartridge body 232 may be divided into three regions.

Three different liquid detergents may be stored inside the cartridge body 232. In one embodiment, detergent, conditioner, and desiccant may be stored in the divided regions of the cartridge body 232.

A material having a fixed shape may be used as the support plate 234. Accordingly, the cartridge body 232 may be stably disposed on the support plate 234. A connection hole 236, through which the outlet port 240 passes, may be formed in the support plate 234. The port body 242 of the outlet port 240 is inserted into the connection hole 236, to be connected to the cartridge body 232 disposed on the support plate.

Referring to FIG. 17, the support plate 234 has an approximately rectangular plate shape and has the connection hole 236 formed on one side thereof. Referring to FIG. 17, a plurality of connection holes 236, which are spaced apart from each other in a left-right direction, are formed in the support plate 234.

The outlet port 240 includes the port body 242 having a connection flow path 244 formed therein, the port exit 248 disposed on one side of the port body 242 and connected to the connector 150, and a port entrance 246 extending upward from the port body 242 and connected to the cartridge body 232.

The outlet port 240 includes the plurality of port bodies 242 and a kit connection part 252 connecting the plurality of port bodies 242 to each other.

The connection flow path 244 disposed in the port body 242 may have a bent shape in some sections. Accordingly, the detergent solution stored in the cartridge body 232 dispose thereon may flow to the connector 150.

The port exit 248 is mounted in the inlet port 162 of the connector body 151. The port exit 248 is inserted into the mounting recess 164 of the inlet port 162. When the port exit 248 is mounted in the inlet port 162, the connection flow path 244 of the outlet port 240 may be connected to the inner flow path 152 of the connector 150. The port exit 248 is disposed below the port entrance 246.

The outlet 250, through which the detergent solution stored in the cartridge body 232 is discharged, is formed in the port exit 248. The outlet 250 of the port exit 248 may be covered by the hole cover (not shown). However, the hole cover may be removed when a user connects the cartridge 230 to the connector 150, or the hole cover may be opened by the pin 262, disposed at the connector 150, when the cartridge 230 is mounted to the connector 150.

Referring to FIG. 22, the detergent supply device 100 according to another embodiment of the present disclosure may include a pusher 260 applying pressure to the cartridge body 232. The pusher 260 includes a pressure plate 260a applying pressure to the cartridge body 232, and a pressurizer 260b applying a force to the pressure plate 260a. The pressure plate 260a is disposed to come into close contact with the cartridge body 232. The pressurizer 260b is disposed between the case 102 and the pressure plate a 260a. The pusher 260 may pressurize the cartridge body 232 at a constant pressure. Accordingly, when first valve holes 118a, 118b, and 118c are opened by the valve 200, the detergent solution stored in the cartridge body 232 may be supplied to the discharge chamber 15.

Hereinafter, movement of the valve 200 by operation of the valve moving device 130 and a flow of the detergent solution will be described with reference to FIGS. 23 to 25.

Figure 23:
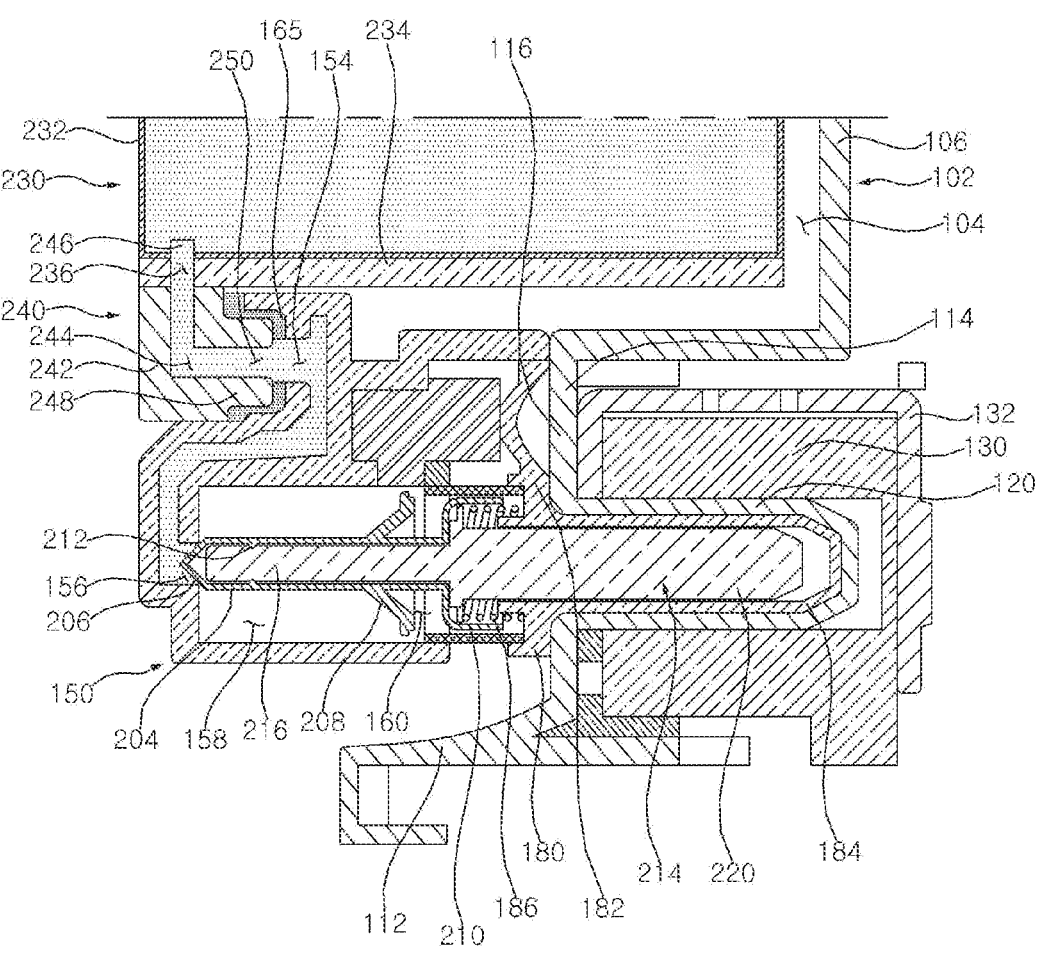

Referring to FIG. 23, when no current is applied to the valve moving device 130, only the elastic force of the elastic member 186 acts on the valve 200. The elastic member 186 applies force to the valve 200 in the second direction. The first cap 206 of the valve 200 closes the first discharge hole 156 of the connector 150.

Accordingly, the detergent solution stored in the cartridge body 232 does not flow to the discharge chamber 158. In this case, an amount of the detergent solution stored in the cartridge body 232 remains constant, such that the shape of the cartridge body 232 does not change.

Figure 24:
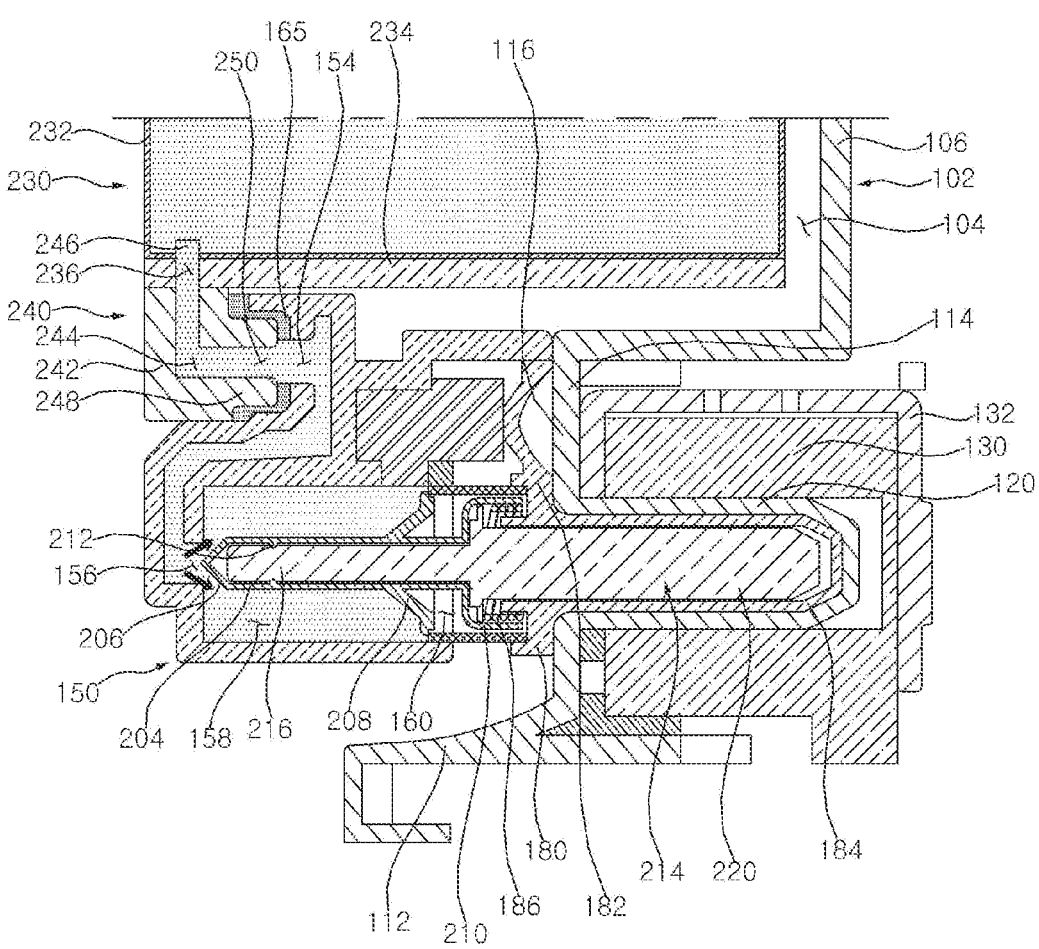

Referring to FIG. 24, when a current is applied to the valve moving device 130, such that a magnetic field is generated in a coil, the flinger 220 moves in the first direction. That is, the valve 200 moves in the first direction. In this case, the first cap 206 of the valve 200 opens the first discharge hole 156, and the second cap 208 of the valve 200 closes the second discharge hole 160, The detergent solution stored in the cartridge body 232 may flow downward into the discharge chamber 158. The detergent solution flowing through the first discharge hole 156 may be temporarily stored in the discharge chamber 158.

The amount of the detergent solution filled in the discharge chamber 158 may vary depending on an operating time of the valve moving device 130.

Figure 25:
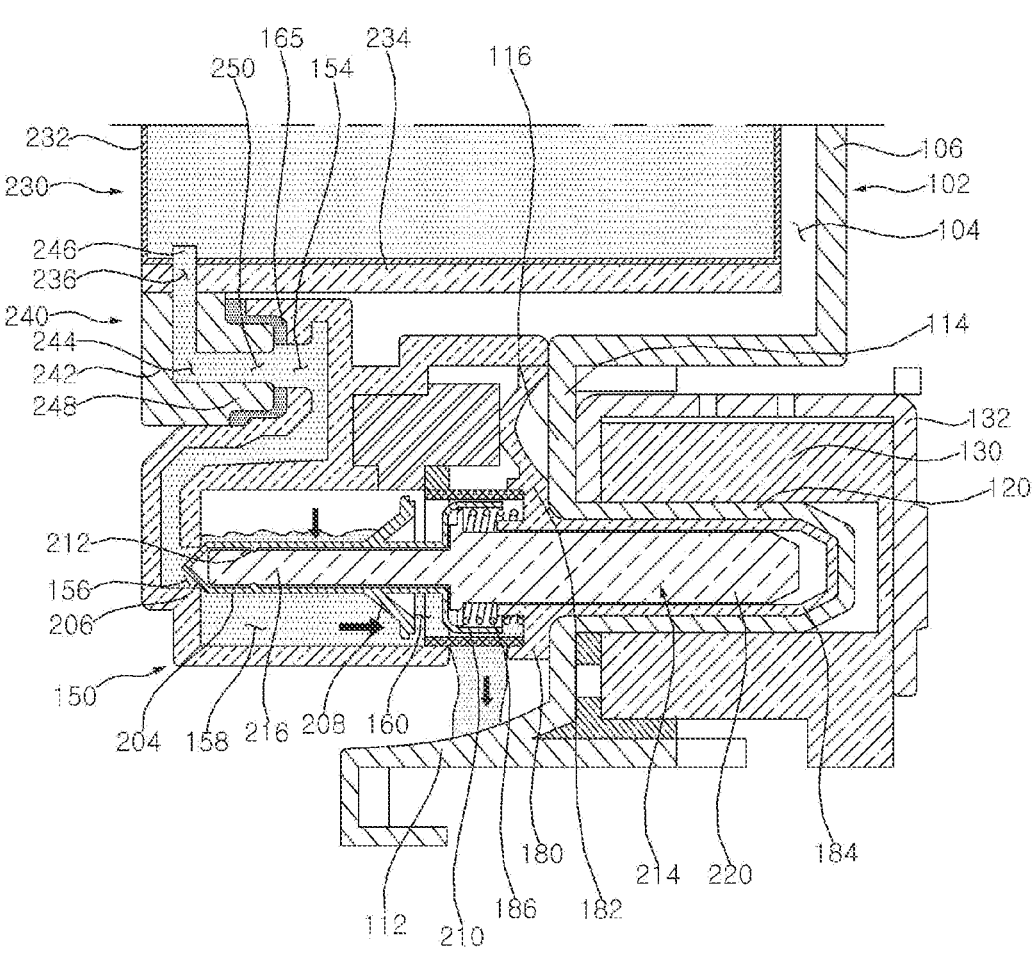

Referring to FIG. 25, when no current is applied to the valve moving device 130, the valve 200 moves again in the second direction by the elastic member 186. Accordingly, the first cap 206 closes the first discharge hole 156, and the second cap 208 opens the second discharge hole 160. Accordingly, the detergent solution stored in the discharge chamber 158 flows to the discharge connector 190 through the second discharge hole 160. After flowing to the discharge connector 190, the detergent solution flows downward through the third discharge hole 192. The detergent solution flowing from the discharge connector 190 through the third discharge hole 192 flows along the lower wall 112. The detergent solution flowing along an inclined surface of the lower wall 112 may be discharged into the washing space, formed inside the cabinet 12, through the separation space 144 between the case 102 and the door 10.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the disclosure as defined by the appended claims, and such modifications should not be individually understood from the technical spirit or prospect of the present disclosure.

The invention claimed is:

1. A dishwasher comprising:
a cabinet that defines a washing space therein, the cabinet having an opening at one side;
a door configured to open and close the opening of the cabinet; and
a detergent supply device disposed at the door and configured to supply detergent solution to the washing space,
wherein the detergent supply device comprises:
a case disposed at the door,
a connector that is configured to connect a cartridge for storing the detergent solution to the case and defines a discharge chamber configured to discharge the detergent solution stored in the cartridge to an outside of the connector, the connector having (i) a first side removably connected to the case and (ii) a second side configured to connect to the cartridge,
a valve disposed at the connector and configured to, based on moving relative to the connector, fluidly connect the discharge chamber to the cartridge or to the outside of the connector, and
a valve moving device disposed at the case and configured to move the valve in a first direction,
wherein the connector comprises:
a connector body configured to connect to the cartridge, the connector body defining (i) a first discharge hole configured to discharge the detergent solution discharged from the cartridge to the discharge chamber and (ii) a second discharge hole configured to discharge the detergent solution in the discharge chamber to the outside of the connector, and a connector cover that is connected to the connector body and defines a receiving space configured to receive the valve that moves into the valve moving device, and wherein the connector cover separates the receiving space from an area of the case in which the valve moving device is disposed.

2. The dishwasher of claim 1, wherein the valve is configured to, based on moving relative to the connector, open and close the first discharge hole or the second discharge hole.

3. The dishwasher of claim 2, wherein the valve is configured to:

based on operation of the valve moving device, move (i) in the first direction toward the valve moving device or (ii) in a second direction opposite to the first direction, based on the valve moving in the first direction, close the second discharge hole, and based on the valve moving in the second direction, close the first discharge hole.

4. The dishwasher of claim 1, wherein the valve moving device comprises a solenoid configured to, based on a current being applied to the valve moving device, generate a magnetic field to thereby move the valve in the first direction.

5. The dishwasher of claim 1, wherein the valve comprises:

a valve body disposed inside the discharge chamber and configured to open and close the first discharge hole or the second discharge hole; and a valve mover connected to the valve body and configured to move the valve body based on operation of the valve moving device, and wherein the valve mover is disposed in the receiving space of the connector cover.

6. The dishwasher of claim 5, wherein the connector cover comprises:

a cover plate connected to the connector body; and a valve housing that is inserted into the valve moving device and defines the receiving space in which the valve mover is disposed, and wherein the valve housing separates the valve moving device from the receiving space in which the valve is disposed.

7. The dishwasher of claim 6, wherein the detergent supply device comprises an elastic member having (i) a first side in contact with the cover plate and (ii) a second side in contact with the valve, and wherein the elastic member is configured to apply force to the valve in a second direction opposite to the first direction.

8. The dishwasher of claim 7, wherein the valve body comprises an elastic member cover that defines a space in which the elastic member is disposed, the elastic member cover having a surface that contacts the second side of the elastic member.

9. The dishwasher of claim 5, wherein the valve mover comprises:

an inner rod connected to the valve body; and a flinger disposed in a valve housing and made of a steel material that is responsive to the valve moving device.

10. The dishwasher of claim 9, wherein the valve body comprises:

an outer rod that extends in a front-rear direction in which the discharge chamber extends;

a first cap disposed at an end of the outer rod, the first cap being configured to open and close the first discharge hole; and a second cap that extends in a circumferential direction of the outer rod, the second cap being configured to open and close the second discharge hole.

11. The dishwasher of claim 1, wherein the connector comprises a discharge connector disposed between the connector body and the connector cover, the discharge connector being configured to discharge the detergent solution from the discharge chamber to the washing space of the cabinet.

12. The dishwasher of claim 11, wherein the discharge connector has a cylindrical shape with a hollow inner portion, the discharge connector having a plurality of third discharge holes that are defined at a circumferential surface of the discharge connector and spaced apart from one another in a circumferential direction of the discharge connector.

13. The dishwasher of claim 11, wherein the discharge connector is disposed at a discharge end of the discharge chamber, wherein an inner diameter of the discharge connector is smaller than an inner diameter of the discharge chamber, and wherein the valve is configured to, based on the valve being moved by the valve moving device in the first direction, come into contact with the discharge connector to thereby close the second discharge hole of the discharge chamber.

14. The dishwasher of claim 1, wherein the case defines a cartridge space configured to accommodate the cartridge therein, the case comprising a connector mounting part that is disposed below the cartridge space and connected to the connector, and wherein the connector mounting part is disposed at a rear side of the case, and the valve moving device is disposed at the rear side of the case.

15. The dishwasher of claim 14, wherein the connector mounting part comprises:

a first wall that defines at least one valve hole; and a pair of second walls that protrude forward from ends of the first wall, the pair of second walls comprising a pair of fixing protrusions, respectively, the pair of fixing protrusions being coupled to the connector, and wherein the first wall comprises a cover housing that extends rearward from the at least one valve hole, the cover housing defining a space configured to receive the valve.

16. The dishwasher of claim 15, wherein the connector comprises a pair of holders that are disposed at sides of the connector and face the pair of second walls, respectively, each of the pair of holders being fixed to one of the pair of fixing protrusions, and wherein each of the pair of holders surrounds a portion of one of the pair of fixing protrusions and has a side that is open in a direction in which the connector is coupled to the case.

17. The dishwasher of claim 14, wherein the case comprises:

a rear wall that faces a rear surface of the door;

an upper wall that covers a top of the cartridge space;

sidewalls that extend from ends of the rear wall toward the washing space; and a lower wall that covers a bottom of the cartridge space or the connector mounting part, and wherein the lower wall has an inclined surface that extends downward toward the washing space.

18. The dishwasher of claim 17, further comprising a case door disposed at one side of the case and configured to cover the cartridge space, wherein a separation space is defined between a lower end of the case door and a lower end of the case, the separation space being configured to discharge the detergent solution discharged from the cartridge into the washing space.

19. The dishwasher of claim 18, wherein the case door extends below the cartridge space and is configured to cover the connector.

\* \* \* \* \*